United States Patent [19]
Shaffer

[11] Patent Number: 5,696,637
[45] Date of Patent: Dec. 9, 1997

[54] APPARATUS FOR POSITIONING AN OPTICAL LINE OF SIGHT WITHIN A HEMISPHERIC REGION

[75] Inventor: James E. Shaffer, Maitland, Fla.

[73] Assignee: Reliance Electric Industrial Company, Cleveland, Ohio

[21] Appl. No.: 375,559

[22] Filed: Jan. 19, 1995

Related U.S. Application Data

[63] Continuation-in-part of Ser. No. 287,532, Aug. 8, 1994.

[51] Int. Cl.[6] .................. G02B 5/08; G02B 7/182; G02B 26/08
[52] U.S. Cl. .................. 359/857; 359/861; 359/877; 359/200; 359/220
[58] Field of Search .................. 359/857, 858, 359/861, 862, 865, 872, 877, 200, 220, 401, 405, 850

[56] References Cited

U.S. PATENT DOCUMENTS

| | | | |
|---|---|---|---|
| 3,262,364 | 7/1966 | Kollmorgen . | |
| 3,801,187 | 4/1974 | McMichael | 359/857 |
| 4,108,551 | 8/1978 | Weber . | |
| 4,227,776 | 10/1980 | Morton et al. . | |
| 4,264,203 | 4/1981 | Pirlet . | |
| 4,655,591 | 4/1987 | Kriz | 359/857 |
| 4,663,698 | 5/1987 | Tomlinson . | |
| 4,729,071 | 3/1988 | Solomon | 359/220 |
| 4,787,725 | 11/1988 | Preussner et al. | 359/401 |
| 4,827,387 | 5/1989 | Ferren et al. . | |
| 5,044,738 | 9/1991 | Shaffer . | |
| 5,371,581 | 12/1994 | Wangler et al. . | |
| 5,543,954 | 8/1996 | Nicholson . | |

FOREIGN PATENT DOCUMENTS

| | | |
|---|---|---|
| 0120329A2 | 10/1984 | European Pat. Off. . |
| 0120329A3 | 10/1984 | European Pat. Off. . |
| 0564828A1 | 10/1993 | European Pat. Off. . |
| 0565904A1 | 10/1993 | European Pat. Off. . |
| 2565362 | 12/1985 | France . |
| 3217785C1 | 12/1983 | Germany . |
| 2172122A | 9/1986 | United Kingdom . |
| WO8404175 | 10/1984 | WIPO . |

*Primary Examiner*—Ricky D. Shafer
*Attorney, Agent, or Firm*—Craig N. Killen; John M. Miller; John J. Horn

[57] ABSTRACT

An optical apparatus for selectively directing a line of sight between a residence location and locations within a substantially hemispherical field of regard. The apparatus includes a stator which supports a first stage for rotation about a first axis of rotation. A second stage is supported by the first stage for at least partial rotation about a second axis of rotation. The first stage and the second stage include respective mirrors which direct the line of sight between the residence location and the locations in the field of regard. The first stage and the second stage are each operatively rotated by one or more foundation-based drive motors or the like. A drive train arrangement is preferably utilized to transfer motive power from the stationary drive motor to the second stage.

15 Claims, 19 Drawing Sheets

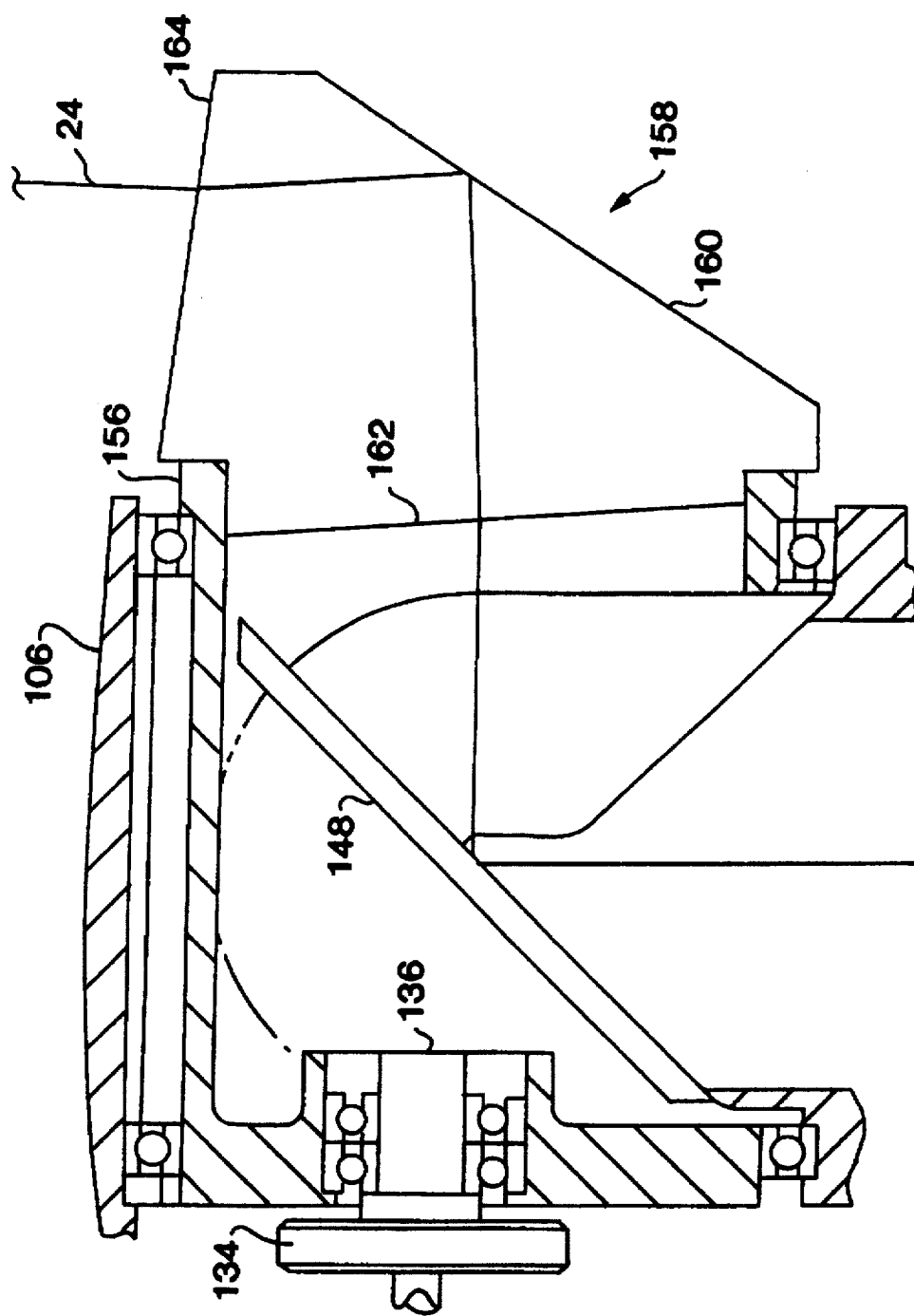

1

APPARATUS FOR POSITIONING AN OPTICAL LINE OF SIGHT WITHIN A HEMISPHERIC REGION

CROSS-REFERENCE TO A RELATED APPLICATION

This is a continuation-in-part of application Ser. No. 08/287,532, filed Aug. 8, 1994, now pending.

BACKGROUND OF THE INVENTION

The present invention relates to an apparatus which is capable of selectively directing a line of sight between a residence location and multiple locations within a substantially hemispherical field of regard. As used herein, the term "line of sight" is generally intended to indicate the centerline axis of a field of optical view. The term "field of regard" is generally intended to indicate the overall spatial extent through which an apparatus constructed in accordance with the invention may vary the line of sight. Furthermore, the term "hemispherical" generally refers to an area in which locations therein may be defined in polar coordinates with an "azimuthal" component varying by a full 360 degrees and an "elevational" component varying by at least 180 degrees.

In many applications, it is desirable to selectively vary the location to which the field of view of an optical device is directed. For example, consider a video surveillance system utilized to monitor a particular area. At a given time, the field of view of a single camera may be less than the entire area to be monitored. As a solution, these cameras are often situated on a gimbaled mount equipped with a drive motor. Selective actuation of the motor functions to move the camera so that the field of view may be varied as desired. Alternatively, a plurality of cameras situated on respective fixed mounts may be utilized.

In addition to passive optical viewing systems such as that described above, active optical systems incorporating laser devices or the like are becoming increasingly prevalent in various scanning and imaging applications. One such device which is conceptually simple in operation is a laser rangefinder utilized to determine the distance between two locations. In such a system, a laser source at a first location is situated having its line of sight in the direction of a second location. A short-pulse laser beam may then be emitted, which is at least partially reflected back to the source. A time-of-flight measurement thus derived may serve as the basis of calculating distance between the two locations.

Devices have been provided to permit a line of sight terminating at a residence location to be translated to various locations within a field of regard. One such device is disclosed in U.S. Pat. No. 5,044,738, issued to the present inventor and incorporated fully herein by reference (the '738 patent). This patent describes an optical system designed to be used in a situation in which a small aperture window is available. The device includes two separate optical offsetting component devices rotatable about respective axes.

The component devices of the '738 patent are situated such that the output of the first device, about which it rotates, is axially aligned with the input of the second device. The output of the second device, about which it rotates, defines an eye piece for the overall system. The input of the first device is situated along another axis and defines the input of the overall system. The three axes intersect at the small aperture to permit wide angle viewing therethrough.

It can be seen that the field of regard of the system disclosed in the '738 patent will be limited to a cone defined by the cumulative angle between the axis extending through the system input and the axis extending through the system output. Thus, such an optical system would be generally unsuitable for applications requiring a field of regard which is substantially hemispheric.

Additionally, as the gist of the '738 patent is concerned with describing the optical interrelationship between the component devices, specific means by which the devices were to be rotated is not discussed in detail. In many high speed or precision applications, however, the mechanical or electromechanical means utilized to direct the line of sight may take on considerable importance.

SUMMARY OF THE INVENTION

The present invention recognizes the foregoing drawbacks, and others, of prior art constructions and methods.

It is thus an object of the present invention to provide an improved optical apparatus.

It is a more particular object of the present invention to provide an apparatus for selectively directing a line of sight between a residence location and locations within a substantially hemispherical field of regard.

It is also an object of the present invention to provide an optical apparatus in which motive power for each of two rotatable stages is provided by one or more foundation-based drive motors.

It is an additional object of the present invention to provide an optical apparatus capable of directing the line of sight along a predetermined pattern in the substantially hemispherical field of regard.

It is a more particular object of the present invention to provide an optical apparatus which is operative to repeatedly direct the line of sight along the predetermined pattern on a substantially continuous basis.

Some of these objects are accomplished by an optical apparatus for selectively directing a line of sight between a residence location and locations within a substantially hemispherical field of regard. The apparatus includes a stator supporting a first stage for rotation about a first axis of rotation. A second stage is supported by the first stage for at least partial rotation about a second axis of rotation. First drive means are provided to operatively rotate the first stage and second drive means are provided to operatively rotate the second stage.

At least one first stage mirror is maintained by the first stage and situated to direct the line of sight from the residence location to an axis substantially aligned with the second axis of rotation. At least one second stage mirror is maintained by the second stage and situated to direct the line of sight as the second stage is operatively rotated between a first extreme position and a second extreme position angularly displaced therefrom by at least 90 degrees.

In presently preferred embodiments, the second drive means includes a drive train arrangement operative to transfer motive power from a foundation-based power source to the second stage. Such a drive train arrangement may comprise a first gear portion engaging a stator gear. The drive train arrangement may further include a second gear portion engaging a second stage gear. In an exemplary construction, the first gear portion and second gear portion may be mounted on respective ends of a longitudinal shaft which is rotatably supported by the first stage.

In some such embodiments, the stator gear may comprise a sun gear mounted coaxially with the first axis of rotation.

In this case, the first gear portion may be operative to function as a planetary gear of the sun gear as the first stage is rotatably driven about the first axis of rotation. The stator gear and the first gear portion may also be configured as a bevel gear arrangement constructed such that the longitudinal shaft rotates at an angular rate less than that of the first stage.

In other exemplary embodiments, the second drive means may comprise a drive train arrangement coupled to the second stage and operative to translate full rotational motion of the first gear portion to a reciprocative partial rotational motion. Such a drive train arrangement may comprise a linkage member defining therein a pair of bores for respectively receiving first and second lobe members of respective lesser and greater extent. In this case, the first lobe member may be coupled to the first gear portion and the second lobe member may be coupled to the second stage. Partial rotational motion may also be achieved by a drive train arrangement which includes a cam member operatively engaging a cam follower rotatably supported by the second stage.

The drive train arrangement may also include an auxiliary stage rotatably supported by the stator. Preferably, the auxiliary stage is generally coaxial with the first stage, but capable of rotation at an angular rate disparate thereto. Such an auxiliary stage may include a circumferential gear portion engaging a second stage gear. Alternatively, the upper circumferential surface of the auxiliary stage may define a cam track operatively engaging a cam follower rotatably supported by the second stage.

Other exemplary embodiments having an auxiliary stage include an elongated linkage. A first end of the linkage is pivotally connected to the second stage such that a longitudinal reciprocation of the linkage will effect a reciprocative partial rotational motion in the second stage. Further, a translation assembly is operatively connected between the auxiliary stage and a second end of the linkage such that rotation of the auxiliary stage causes the linkage to longitudinally reciprocate. Preferably, the linkage is pivotally connected to the second stage at a pivot location substantially parallel to the second axis of rotation, but displaced therefrom by a predetermined distance.

In some such constructions, the auxiliary stage includes a circumferential portion oriented at an acute angle with respect to an angle orthogonal to the first axis of rotation. In this case, the translation assembly includes a translation element operatively connected to the circumferential portion. Preferably, the translation element is further operatively connected to the first stage such that substantially no relative angular movement occurs therebetween about the first axis of rotation. Toward this end, an axial slot may be defined in the first stage for receiving a radial pin on the translation member.

The translation element may comprise an annular member rotatably supported by the circumferential portion of the auxiliary stage. In this case, the second end of the linkage may be pivotally connected to a circumferential location on the annular member. Toward this end, the annular member may preferably include a ledge portion to which the second end of the linkage member is pivotally connected. A spherical portion may be defined on the second end of the linkage member for receipt in a complementary socket defined in the ledge portion. A retaining piece may be attached to the ledge portion for maintaining the spherical portion in the socket.

In embodiments utilizing an auxiliary stage, the first drive means and the second drive means may collectively comprise a single drive motor having a pair of gears mounted on the output shaft thereof. For example, a larger first drive gear and a smaller second drive gear may be mounted axially adjacent one another on the output shaft. The larger first drive gear preferably engages the first stage and the smaller second drive preferably engages the auxiliary stage so that the auxiliary stage rotates at a selected angular speed differential with respect to the first stage. Alternatively, separate drive motors may be provided for each of the first stage and the auxiliary stage.

In some presently preferred embodiments, the at least one first stage mirror may include first and second first stage mirrors. One of these first stage mirrors may be situated to direct the line of sight between the residence location and the second first stage mirror. The second first stage mirror may be situated to direct the line of sight between the first first stage mirror and substantially along the second axis of rotation. In this situation, the second axis of rotation is preferably angularly spaced from the first axis rotation by an angular displacement of approximately 45 degrees.

In some presently preferred embodiments, the respective mirrors are situated to receive and reflect the line of sight along substantially orthogonal angles of incidence. In such embodiments, the second stage preferably includes a single mirror. The first stage in such embodiments may have a single mirror, or may be equipped with more than one mirror, such as three mirrors. Generally, the second drive means in embodiments having orthogonal angles of incidence will be operative to rotate the second stage through a range of limited angular extent. Preferably, this limited angular extent may be no greater than 180 degrees, and may often be no greater than 90 degrees.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification including reference to the accompanying figures in which:

FIG. 3A is an enlarged fragmentary view of illustrating a modified version of the embodiment shown in FIG. 3;

Figure 1:
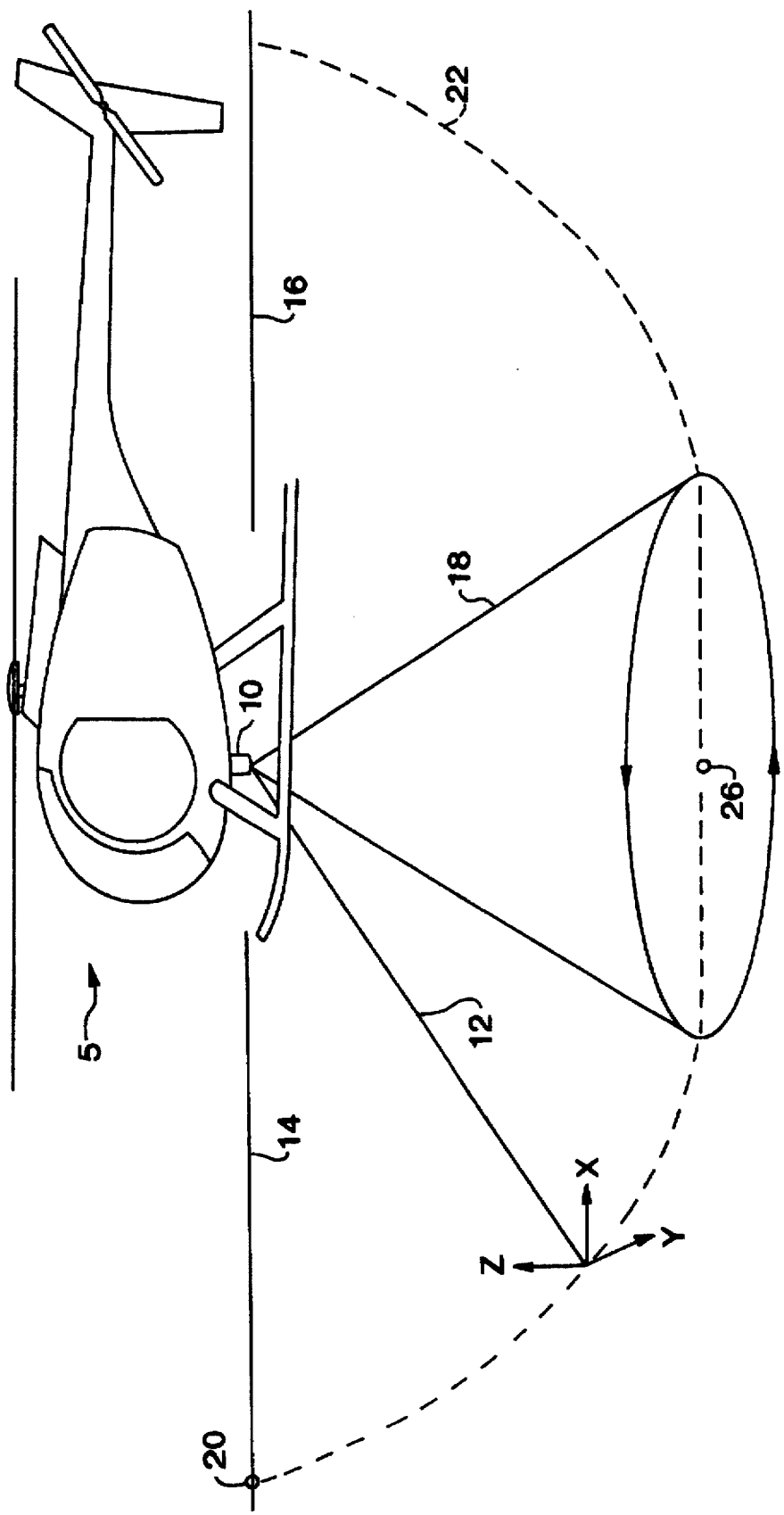
FIG. 1 is a diagrammatic representation illustrating one significant application in which an optical apparatus constructed in accordance with the invention may be utilized.

Repeat use of reference characters in the present specification and drawings is intended to represent same or analogous features or elements of the invention.

DETAILED DESCRIPTION OF THE PREFERRED EMBODIMENTS

It is to be understood by those of ordinary skill in the art that the present discussion is a description of exemplary embodiments only, and is not intended as limiting the broader aspects of the present invention, which broader aspects are embodied in the exemplary construction.

FIG. 1 illustrates one application in which an optical apparatus constructed in accordance with the present invention may be particularly useful. During operation, the region below a helicopter, such as helicopter 5, often constitutes somewhat of a "blind spot" to the helicopter pilot. As a result, the helicopter pilot may often experience difficulty in judging the proximity of objects, such as power lines and the like, which may be present in this region.

Therefore, on-board systems have been developed to monitor the proximity of objects in the region below a helicopter. One such system, developed by Schwartz Electro-Optics, Inc. of Orlando, Fla., is referred to as HOPSS (Hover Obstacle Proximity Sensor System). Generally, this system comprises the following three components: (1) a high-pulse-rate laser rangefinder, (2) a scanning head, and (3) a signal processing unit.

In HOPSS, the scanning head is generally mounted on the bottom of the helicopter fuselage to direct a pulse emitted by the rangefinder along a generally circular scanning pattern. The time-of-flight of the return pulse is then measured and interpreted by the signal processing unit to determine whether any objects are present in the scanning pattern. The signal processing unit preferably includes a display to provide the proximity information thus derived to the helicopter pilot.

Mechanical constraints inherent in the scanning head have limited the scanning pattern through which the pulsed beam of a single laser source has been directed. As a result, greater coverage has been provided by simply increasing the number of scanning heads installed on a helicopter. For example, in one popular configuration, three scanning heads have been installed at selected locations on the fuselage of a particular helicopter. This construction, while providing enhanced coverage, also significantly increases the cost of the overall system.

The present invention, on the other hand, provides an optical apparatus which may be utilized as a scanning head in such a system to singularly provide enhanced scanning coverage. In FIG. 1, such an apparatus is illustrated mounted to the fuselage of helicopter 5, as indicated generally at 10. Apparatus 10 is capable of directing laser beam 12 to locations within a substantially hemispherical field of regard. In other words, laser beam 12 may be directed through an "elevational" sweep of at least 180°, as bounded by boundary lines 14 and 16. The "azimuthal" sweep through which laser beam 12 may be directed is defined by a full rotation of 360 degrees.

This hemispherical field of regard provided by the present invention is in contrast to the prior scanning heads discussed above, which were generally limited to directing the laser beam along a generally circular pattern as described. Such a circular pattern thus limited the scanning capability of a single scanning head generally to the outer surface of a hypothetical cone. For purposes of illustration, such a hypothetical cone is generally indicated at 18. As can be seen, the region inside of the cone was largely unscanned.

Figure 1A:
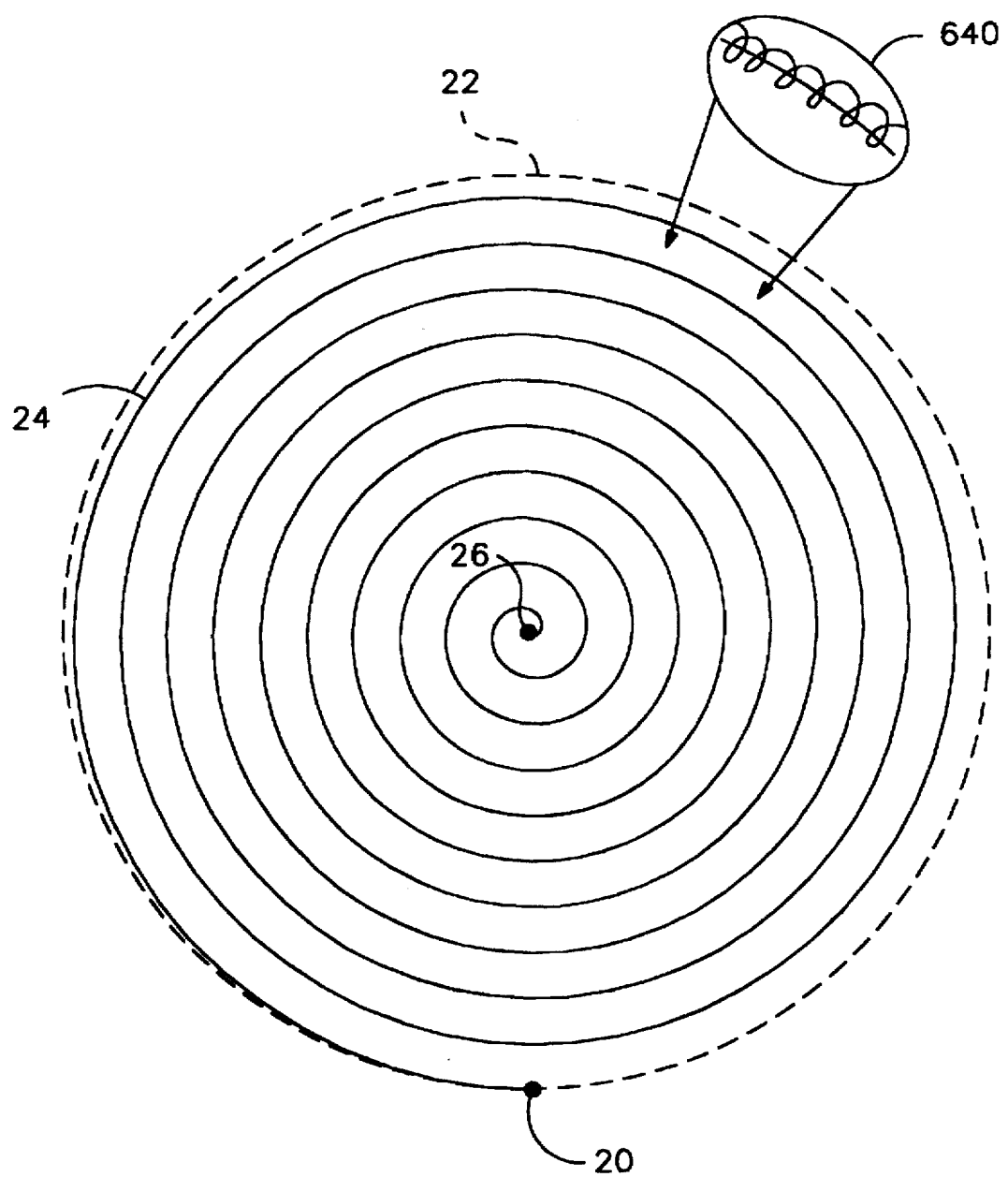
FIG. 1A is a diagrammatic representation of a predetermined pattern along which a line of sight may be repeatedly directed in accordance with an aspect of the invention.

In presently preferred embodiments, apparatus 10 functions to direct its line of sight repeatedly along a predetermined pattern within the hemispherical field of regard which is "known" to the signal processing unit. Referring now also to FIG. 1A, one such predetermined pattern is diagrammatically illustrated as it may appear from above. As an example, this pattern is shown beginning at a point 20 along the upper edge of field of regard 22. It should be understood, however, that an assignment of a "starting point" is essentially arbitrary in this case because the pattern is periodic.

From point 20, the line of sight descends in a spiral, as shown at 24, until reaching "half cycle" point 26. Because of the assignment of starting point 20, half cycle point 26 occurs at a location at the bottom of a "bowl" defined by field of regard 22. In other words, point 26 occurs, in this case, at a location directly below apparatus 10. Although not shown, the line of sight next begins spiraling back up until again reaching point 20. As a result, one cycle of the pattern will be completed.

Apparatus 10 may take on a number of specific embodiments, depending upon the exigencies of a particular application. A number of these embodiments will now be described, each of which has a number of common features which allow it to achieve the overall functional characteristics as described above. It should be distinctly understood, however, that the invention may further include such other embodiments which achieve these or similar functional characteristics.

In order to facilitate explanation of the various embodiments which will be discussed, certain terminology will be utilized consistently throughout. The line of sight of the particular embodiment will be referred to as "LOS 24." The field of view surrounding LOS 24 will be indicated by the reference number 28. The residence location from which LOS 24 will be translated by the particular embodiment to various locations within field of regard 22 will be consistently referred to as "residence location 30." Furthermore, two axes of rotation, the significance of which will be appreciated from the discussion herein, will be respectively referred to as axis 32 and axis 34.

Figure 2:
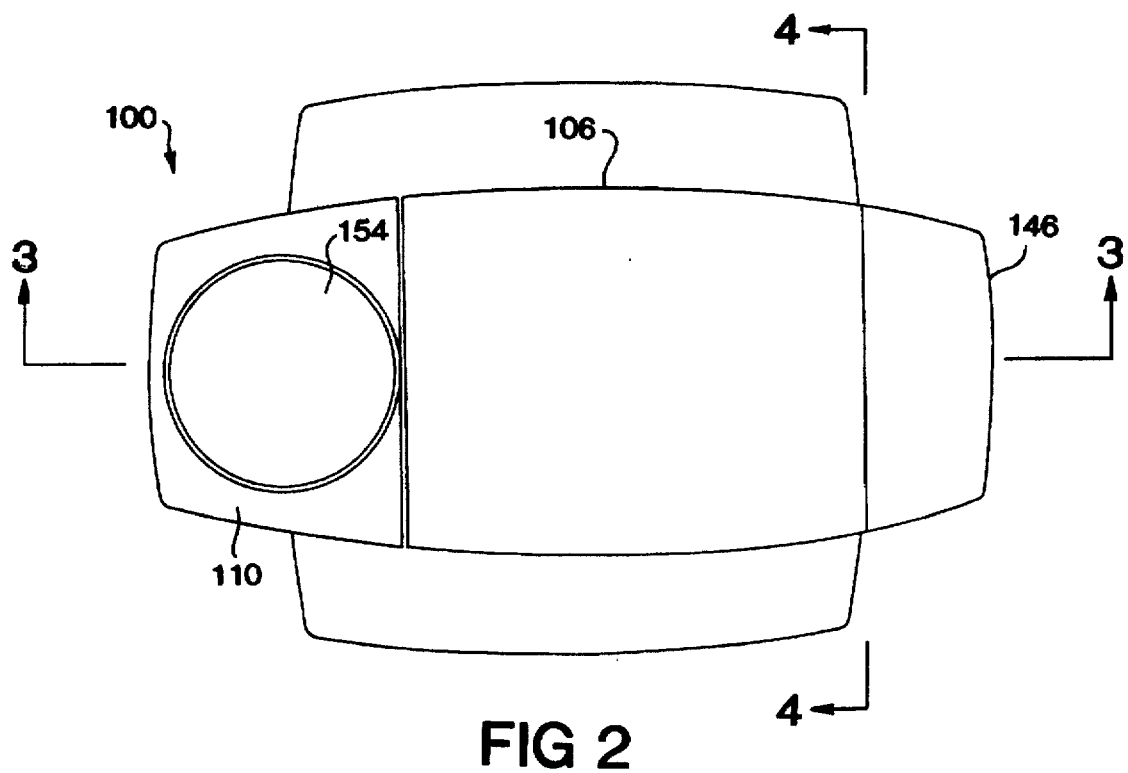
FIG. 2 is a plan view of a first embodiment of an optical apparatus constructed in accordance with the invention.
Figure 4:
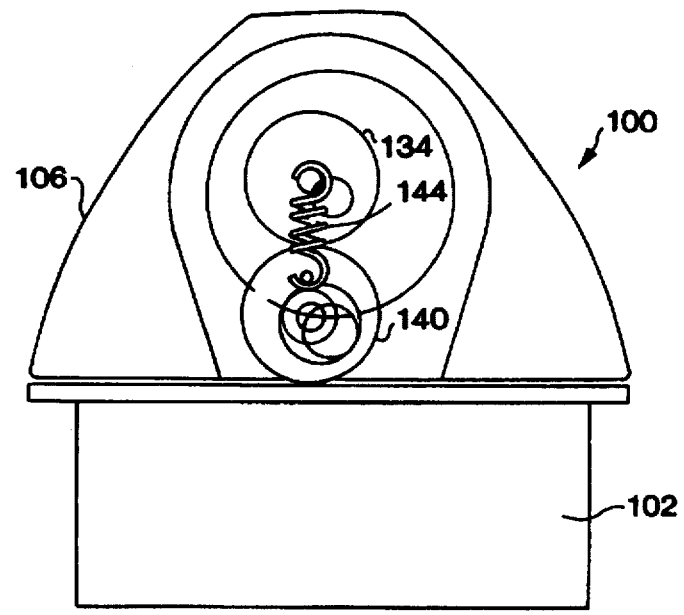
FIG. 4 is an end view as taken along line 4—4 of FIG. 2 so as to illustrate certain internal components therein.
Figure 3:
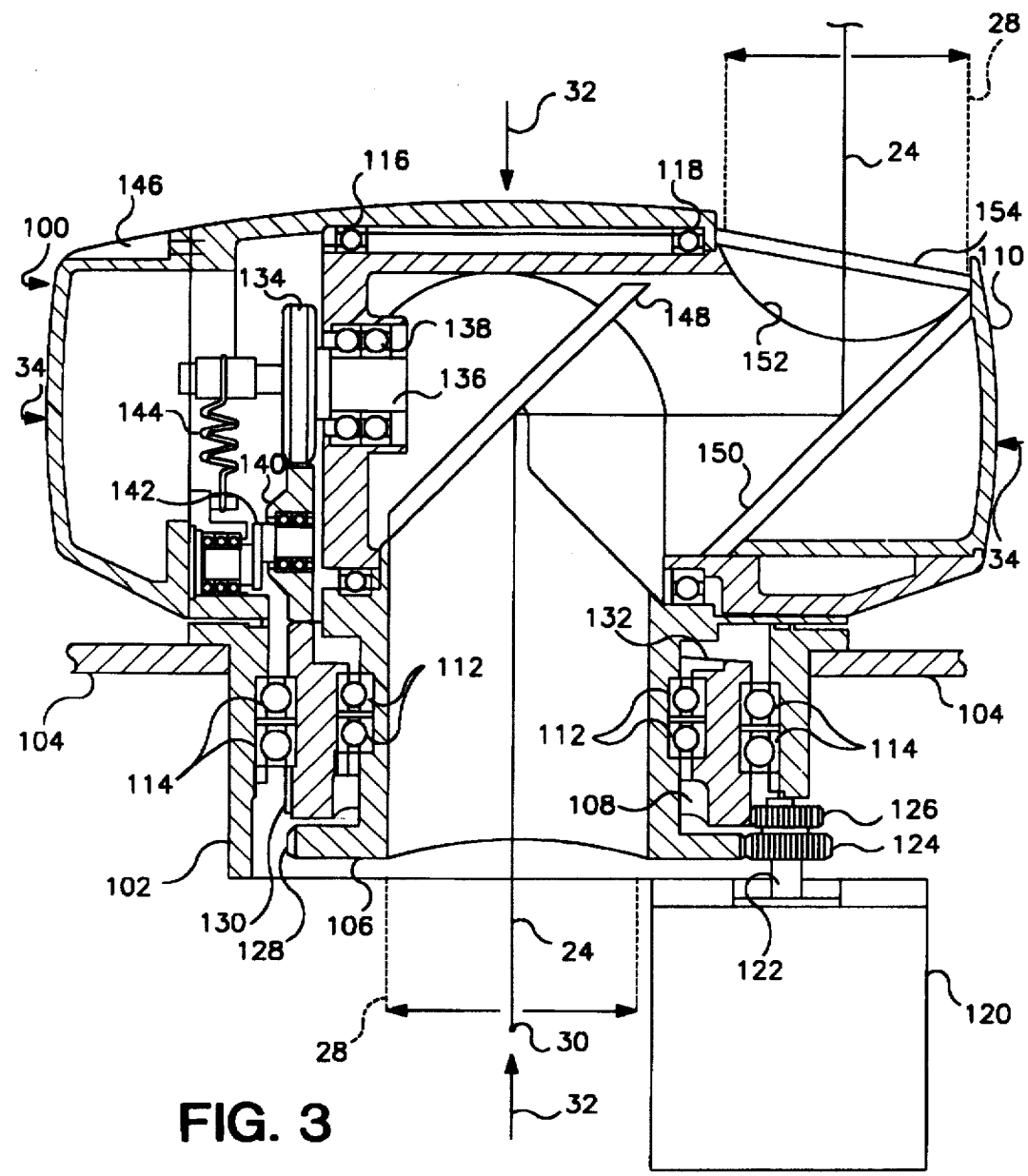
FIG. 3 is a partial cross-sectional view as taken along line 3—3 of FIG. 2.

Referring now to FIGS. 2 through 4, one presently preferred embodiment of an optical apparatus constructed in accordance with the invention is illustrated generally at 100. As can be most easily seen in FIG. 3, apparatus 100 includes a "stator" 102 which is fixedly mounted to an appropriate platform, or "foundation," 104 utilized to support and maintain apparatus 100 in a particular application. For example, platform 104 may correspond to the fuselage of helicopter 5 in the application discussed above. It should thus be appreciated that the term "stator" does not signify stationary with respect to the earth but only with respect to the particular foundation which may or may not be stationary with respect to the earth.

Apparatus 100 further includes a first stage 106 supported by stator 102 for rotation about axis 32. In this case, first stage 106 is rotatably supported through an auxiliary stage 108 mounted coaxially with respect thereto. Apparatus 100 further includes a second stage 110 rotatably supported by first stage 106. Rotation of first stage 106 and auxiliary stage 108 with respect to stator 102 may be facilitated by bearings, such as bearings indicated at 112 and 114. Rotation of second stage 110 with respect to first stage 106 may be similarly facilitated by bearings, such as bearings 116 and 118.

As shown, a drive motor 120 is provided to produce rotation of both first stage 106 and auxiliary stage 108. Although a single motor 120 is illustrated, it should be understood that multiple drive motors could be utilized for the same purpose. In fact, as will become apparent below, multiple drive motors may be preferable in some applications to produce greater selectivity in the rotational control of second stage 110.

Motor 120 includes a drive shaft 122 having a pair of gears 124 and 126 axially mounted thereon. As shown, gear 124 engages a circumferential gear 128 defined about first stage 106. Similarly, gear 126 engages a circumferential gear 130 defined about auxiliary member 108. For reasons that will become apparent, the respective combinations of gears are preferably configured such that auxiliary stage 108 will rotate at a speed slightly less than that of first stage 106.

In this case, second stage 110 rotates partially along an arcuate contour substantially parallel to axis 34. Although motive power to produce this rotation of second stage 110 may be developed by a drive motor mounted on first stage 106, such is generally not desirable in many high speed or precision applications. The undesirability of such a construction is due, at least in part, to the presence of slip rings or other moving contacts which would generally be required to provide electrical power to the motor. Therefore, to eliminate the need for slip rings, apparatus 100 utilize a drive train arrangement in which motive power developed by a foundation-based drive motor or other such drive means is transferred to second stage 110. Other embodiments described herein also preferably utilize such a drive train arrangement.

Although various drive train arrangements are contemplated to effect this partial rotation, apparatus 100 utilizes a cam actuated arrangement. In this regard, auxiliary stage 108 defines a cam track 132 along its upper circumferential surface. A cam follower in the form of a wheel 134 operatively engages cam track 132 to rise and fall as auxiliary stage 108 is rotated. As shown, wheel 134 is attached to a shaft 136 which is rotatably supported within second stage 110. Preferably, rotation of shaft 136 may be facilitated by bearings, such as bearings 138.

It should be appreciated that wheel 134 may be configured to directly engage cam track 132, and such a construction may be preferable in some applications. In order to reduce the diameter of wheel 134, apparatus 100 includes an idler wheel 140 situated to interpose cam track 132 and wheel 134. Idler wheel 140 may be mounted on an end of an offset crank arm 142 having its opposite end rotatably supported by first stage 106. A spring 144 may be provided to facilitate intimate engagement between cam track 132, follower wheel 134 and idler wheel 140. The interrelationship between these elements is also illustrated in FIG. 4, in which an end cap portion 146 of first stage 106 is removed.

Cam track 132 causes idler wheel 140 to move up and down during rotation of auxiliary stage 108. This up and down motion is thereby transmitted to follower wheel 134. It can be seen that shaft 136 is supported within second stage 110 at a location slightly spaced from axis 34, but parallel thereto. As a result, the up and down motion of follower wheel 134 will cause second stage 110 to be partially rotated through a range preferably not exceeding 180 degrees. In presently preferred embodiments, second stage 110 will be rotated through a range of 90 degrees in this manner. Thus, the fully rotational motion of auxiliary stage 108 will be translated to partial rotational motion as desired.

Apparatus 100 further includes a first mirror 148 which is maintained by first stage 106 in such a manner to direct LOS 24 from location 30 to an axis substantially aligned with axis 34. Likewise, a second mirror 150 is maintained by second stage 110 and situated to direct LOS 24 through an aperture defined therein at 152. Preferably, aperture 152 may maintain therein a transparent pane 154.

FIG. 3A illustrates a slightly modified construction of apparatus 100. In this case, first stage 106 rotatably supports a second stage 156, which is similar in many mechanical respects to second stage 110. Unlike second stage 110, however, second stage 156 has a prism 158 fixedly mounted thereon. Prism 158 is preferably formed of a suitable transparent material, such as glass or acrylic.

Prism 158 serves both functions previously performed by mirror 150 and pane 154. In other words, a back surface 160 of prism 158 serves to orthogonally reflect LOS 24 between mirror 148 and FOR 22 as desired. It will generally be desirable to coat surface 160 with a suitable reflective material to enhance the reflectivity thereof.

Surfaces 162 and 164 of prism 158 are configured so as to lie along a plane slightly angled with respect to the perpendicular of the external portion of LOS 24. As a result, the portion of optical energy which is reflected when an incident beam travelling along LOS 24 impinges one of these surfaces will not be reflected directly along the path from which it came.

As can be seen, this angled orientation of surfaces 162 and 164 causes a slight bending in LOS 24 when inside of prism 158. However, the overall configuration of surfaces 160, 162 and 164 causes this bending to be compensated when LOS 24 is outside of prism 158 so as to result in an overall orthogonal reflection. It should be appreciated that mirror 148 could also be constructed as a prism in this manner.

Having discussed the mechanical construction of apparatus 100 in general terms, the manner in which such construction may be utilized to achieve specific optical functions will now be described. Thus, reference is now made to FIGS. 5A through 5C, which diagrammatically illustrate the manner in which apparatus 100 functions to "write" a pattern such as that shown FIG. 1A. It will be appreciated that while the reflecting surfaces of apparatus 100 are situated in an opposing relationship such that LOS 24 is orthogonally reflected, embodiments of the present invention are contemplated in which respective angles of incidence of LOS 24 are nonorthogonal.

Figure 5C:
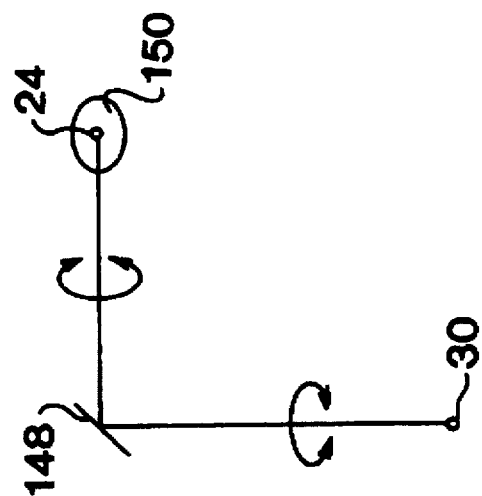
FIGS. 5A through 5C diagrammatically illustrate the manner in which the embodiment of FIGS. 2 through 4 operates to produce a predetermined pattern such as that shown in FIG. 1A.
Figure 5B:
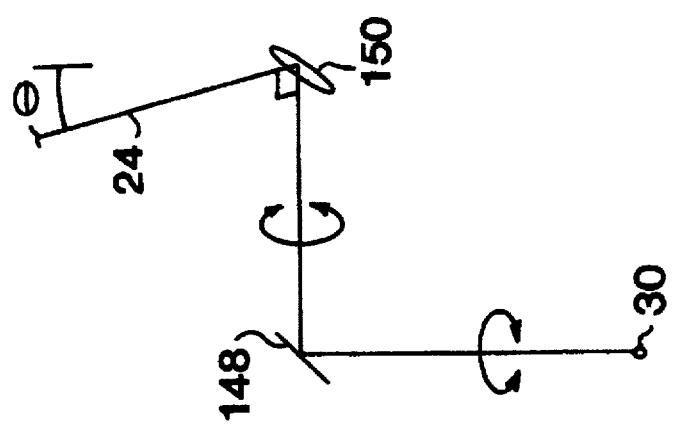
Figure 5A:
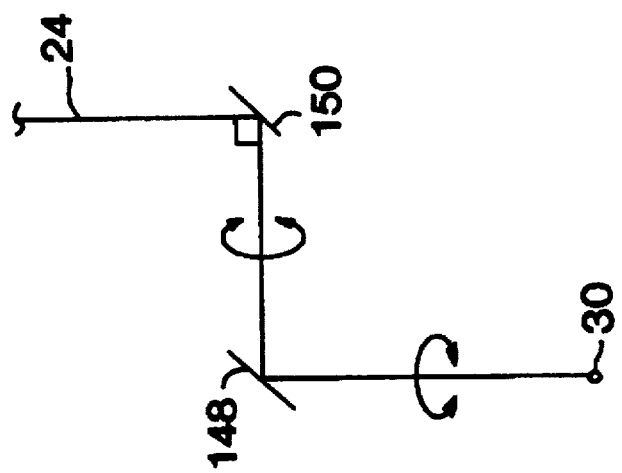

In FIG. 5A, LOS 24 is shown in a position also illustrated in FIG. 3, which directs LOS 26 to a point corresponding to half cycle point 26. Assume now that first stage 106 is rotating at an angular speed in excess of the angular speed at which second stage 110 is partially rotating. For purposes of illustration, a speed ratio between first stage 106 and second stage 110 of twelve-to-one may be assumed.

After one full rotation of first stage 106, LOS 24 may appear as shown in FIG. 5B. As can be seen, mirror 150, which had previously directed LOS 24 along a path substantially aligned with axis 32, has been rotated about its axis of rotation by an angle Θ with respect to its prior position. Thus, the location within field of regard 22 to which LOS 24 is directed will also be changed by this angle e. For a speed ratio of twelve-to-one as assumed, angle Θ will be equal to 15 degrees. This angle defines the spacing, or "pitch," between adjacent turns of the spiral pattern.

After several more rotations of first stage 106, LOS 24 may appear as shown in FIG. 5C. In this case, mirror 150 is rotated by the full 90 degree extent through which second stage 110 may rotate. As shown, LOS 24 is now being directed to a location along the upper rim of field of regard 22, such as starting point 20. For example, with the assumed twelve-to-one speed ratio, this position would occur after first stage 106 had rotated five more times subsequent to the position of FIG. 5B.

Further rotation of first stage 106 causes LOS 24 to rotate back to the position shown in FIG. 5A. Thus, the respective positions of LOS 24 in FIG. 5A and FIG. 5C may be referred to as a first extreme position and a second extreme position, respectively.

Figure 6:
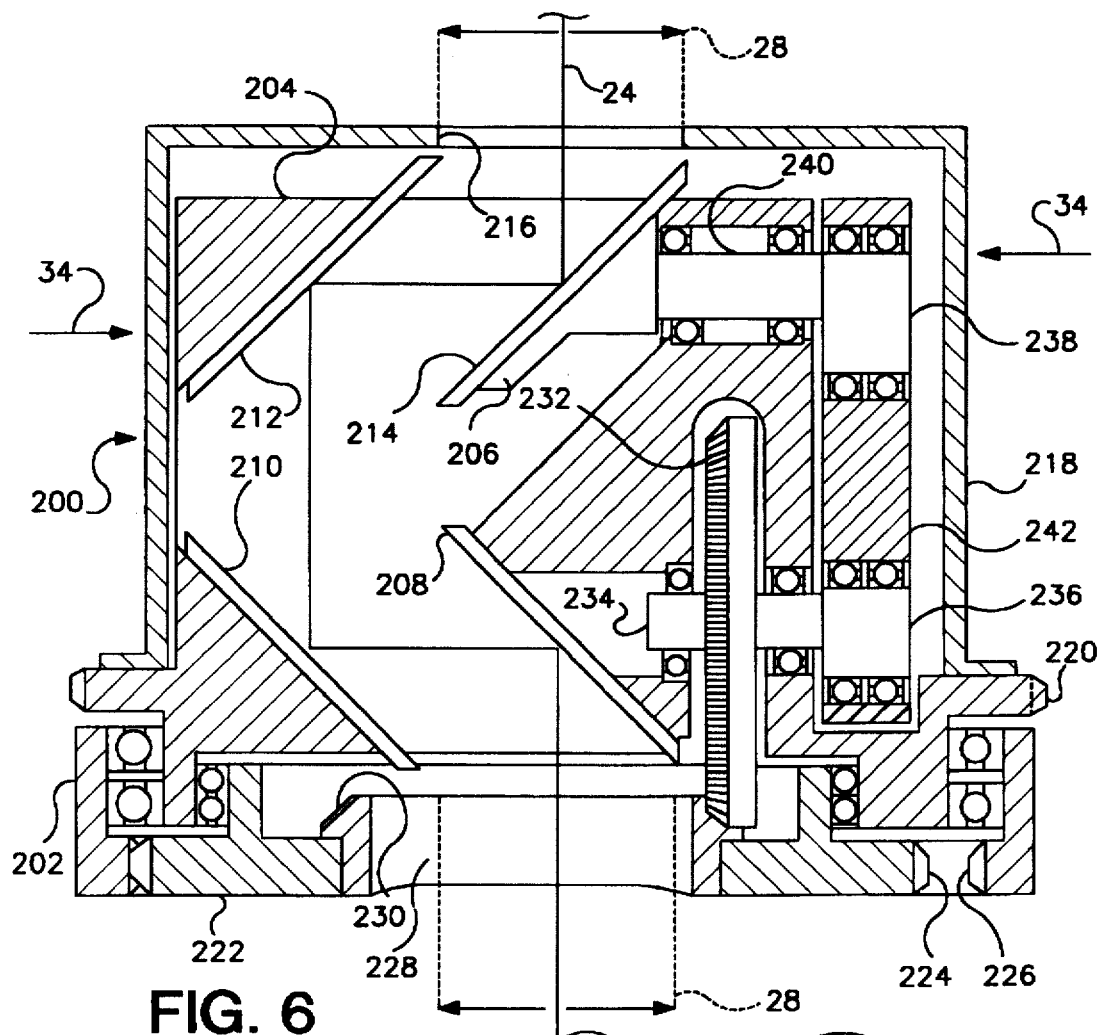
FIG. 6 is a partial cross-sectional view illustrating a second embodiment of an optical apparatus constructed in accordance with the invention.

Another presently preferred embodiment of the present invention is illustrated in FIG. 6 and indicated generally at 200. Apparatus 200 includes a stator 202 rotatably supporting a first stage 204. A second stage 206 is supported by first stage 204 for partial rotation with respect thereto.

In this case, first stage 204 maintains three mirrors 208, 210 and 212 which are situated to direct LOS 24 from location 30 to an axis substantially aligned with axis 34. Second stage 206 maintains a single mirror 214, which is situated to direct LOS 24 through an aperture 216. In this case, aperture 216 is defined in a housing portion 218 which is fixedly attached to first stage 204.

As shown, first stage 204 defines an outer circumferential gear 220 for engagement with a suitable gear of a drive motor or other drive means. As with apparatus 100, apparatus 200 includes a drive train arrangement to effect partial rotational motion of second stage 212. In this case, such a drive train arrangement includes an epicycling gear 222 rotatably supported by first stage 204. It should be noted that the centerline axis of gear 222 is parallel to but slightly offset from axis 32 to permit epicycling thereof as desired.

Epicycling gear 222 has thereon a first gear portion 224 which operatively engages an inner circumferential gear portion 226 of stator 202. Gear 222 also defines therein an aperture 228 to permit passage of LOS 24. As shown, a bevel gear 230 is defined about aperture 228 for engagement with a bevel gear 232 rotatably supported by first stage 204 via shaft 234. The epicycling gear 222 is utilized to reduce the angular speed of gear 232 with respect to that which would otherwise be the case.

In this embodiment, the full rotational motion of gear 232 may be translated to the desired partial rotational motion utilizing a "four-bar linkage" arrangement such as that illustrated. This linkage arrangement includes a first lobe member 236 mounted to the end of shaft 234. A second lobe member 238 is similarly mounted to the end of a shaft 240 of second stage 206. Each lobe member 236 and 238 is rotatably supported within respective apertures defined in a interconnecting linkage member 242.

Figure 6A:
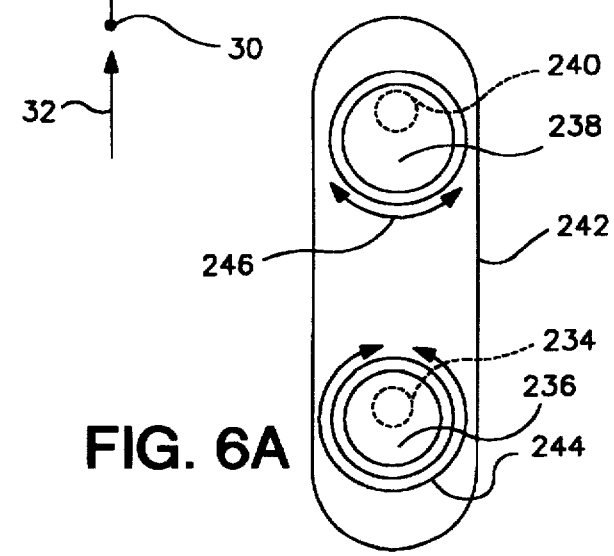
FIG. 6A is an elevational view illustrating a four-bar linkage utilized in the embodiment of FIG. 6.

Referring now also to FIG. 6A, lobes members 236 and 238 are mounted offset from their respective shafts 234 and 240. As can be seen, however, lobe 238 is mounted more offset than lobe 236. As a result of this eccentricity, full rotational motion of lobe member 236 (as shown by arrow 244) will translate into a reciprocative partial rotational motion at lobe member 238 (as shown by arrow 246). As such, a spiral pattern like that shown in FIG. 1A may be created as first stage 204 is rotated.

As noted above, the respective mirrors of optical apparatus 100 and optical apparatus 200 are situated to orthogonally direct LOS 26. Due to this construction, respective second stages 110 and 206 are configured for partial rotational motion. Embodiments which will now be described with reference to FIGS. 7 through 12 are constructed having at least some of their mirrors situated for nonorthogonal reflection. As a result, the second stage may be constructed for full rotation, which may be a particularly desirable feature in many applications.

Figure 7:
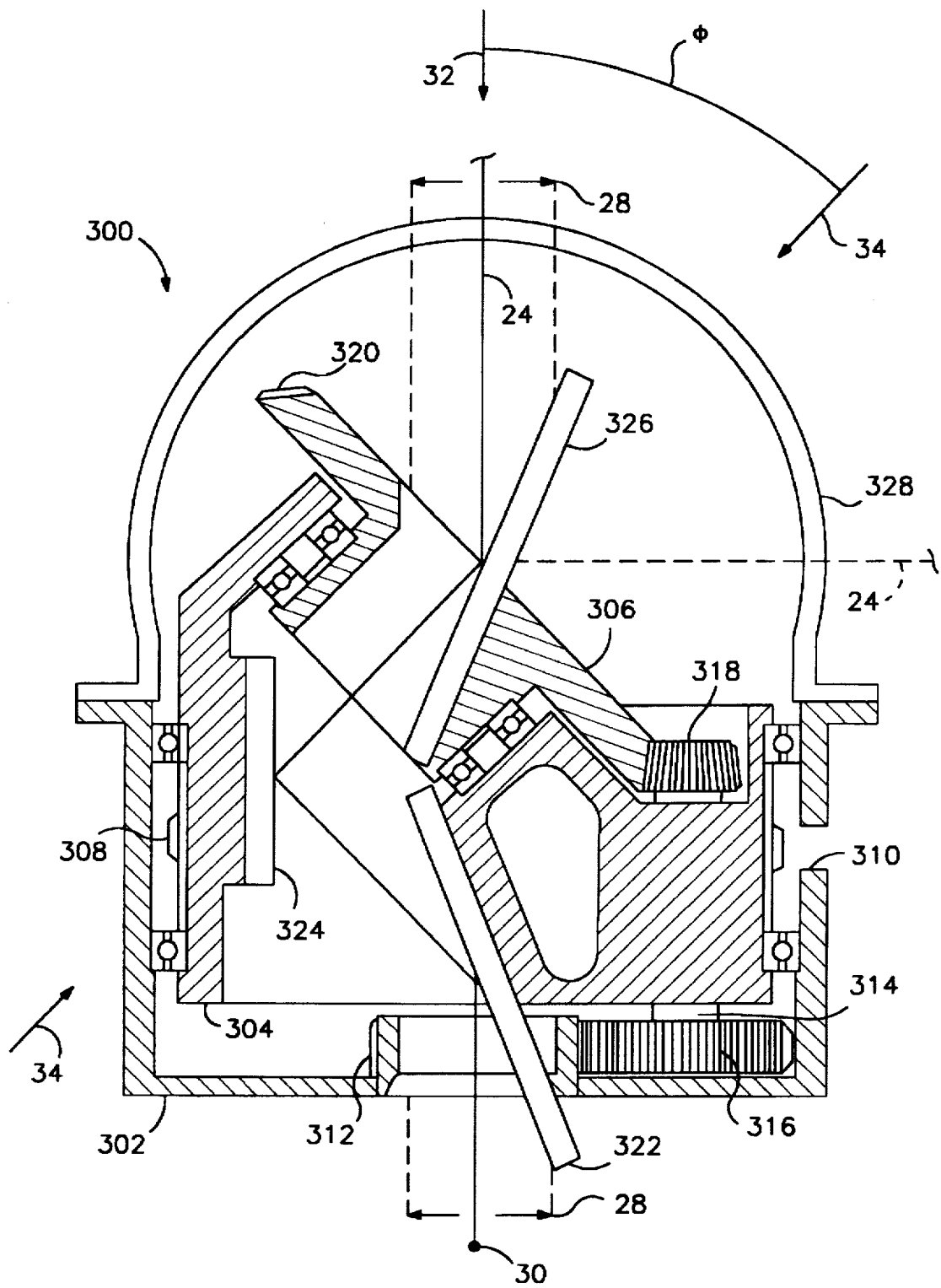
FIG. 7 is a partial cross-sectional view illustrating a third embodiment of an optical apparatus constructed in accordance with the invention.

Referring now to FIG. 7, one such embodiment of an optical apparatus constructed in accordance with the present invention is indicated generally at 300. Apparatus 300 includes a stator 302 rotatably supporting a first stage 304. A second stage 306 is rotatably supported by first stage 304 for full rotation with respect thereto.

As shown, first stage 304 defines a circumferential gear 308 about its outer surface. As a result, first stage 304 may be rotatably driven by engagement of gear 308 with a suitable drive gear (not shown). Such a drive gear may be inserted through an appropriate slot defined in stator 302, such as slot 310.

The drive train arrangement utilized to rotate second stage 306 includes an annular gear 312 about the aperture defined in stator 302 for passage of LOS 24. A shaft 314 rotatably supported by first stage 304 includes respective first and second gear portions 316 and 318 mounted on opposite ends thereof. Gear portion 316 engages annular gear 312, as shown. Gear portion 318, on the other hand, engages a circumferential bevel gear 320 defined about second stage 306.

Rotation of first stage 304 will cause gear portion 316 to revolve around annular gear 312 in a planet-sun relationship. As a result, gear portion 318 will rotate to drive second stage 306, as desired. Again, the gear ratios should be appropriately chosen to achieve the desired relative rotation between first stage 304 and second stage 306.

First stage 304 includes two mirrors, indicated respectively at 322 and 324. In this case, second stage 306 includes a single mirror 326. As can be seen, mirrors 322 and 324 are situated to direct LOS 24 between location 30 and an axis substantially aligned with axis 34. Mirror 326 then directs LOS 24 to the desired location within field of regard 22.

It will be appreciated that, in this case, the angle Φ between axes 32 and 34 will be approximately 45 degrees. As a result, rotation of second stage 306 will cause LOS 24 to translate between a first extreme position substantially parallel to axis 32 and a second extreme position substantially orthogonal to axis 32 as second stage 306 is rotated.

In this case, a protective globe 328 is provided attached to stator 302. Globe 328 should be substantially transparent to the passage of light at the frequencies of interest. It should be appreciated, however, that globe 328 may not be necessary or even desirable in all applications in which apparatus 300 may be utilized.

Figure 8:
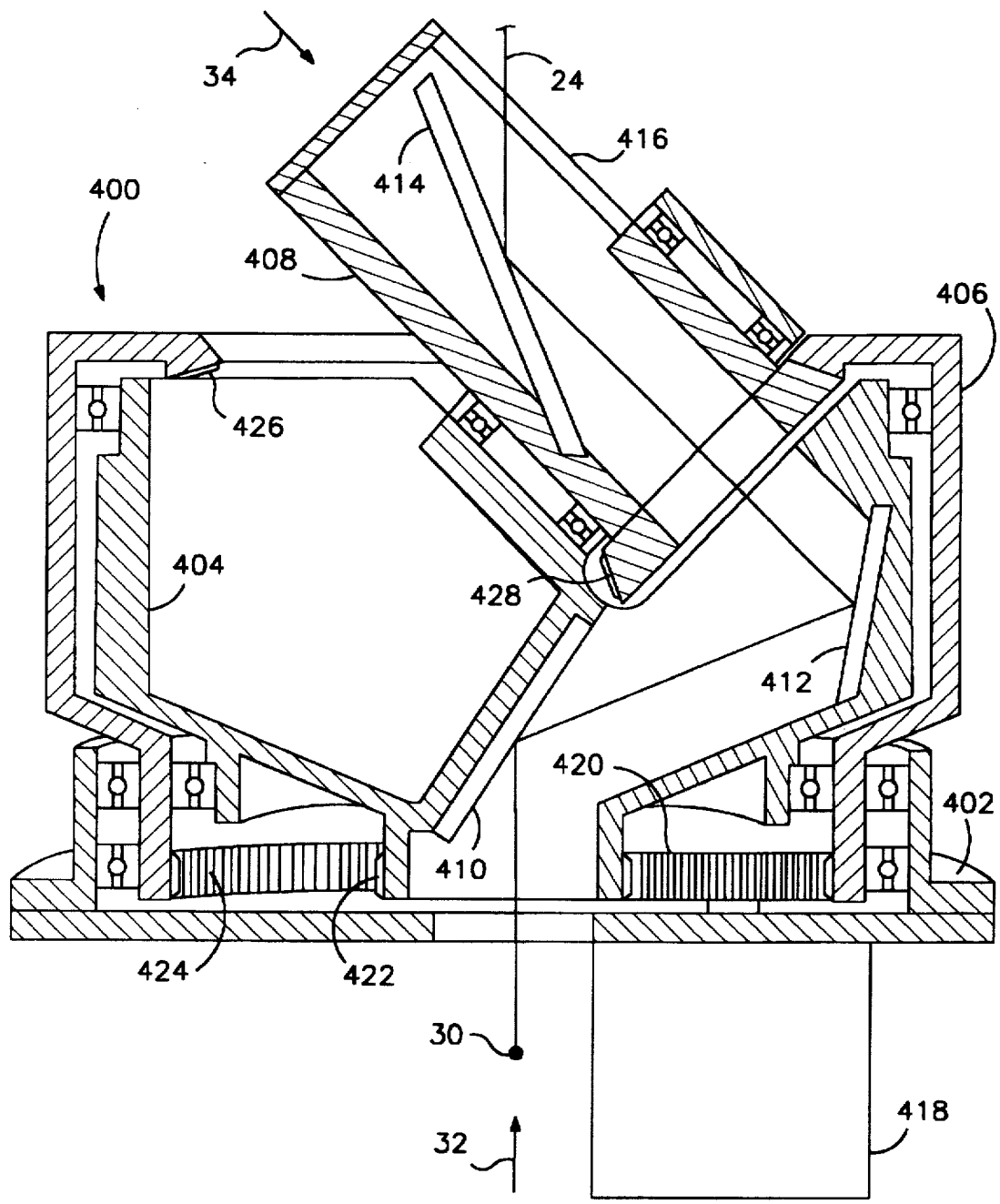
FIG. 8 is a partial cross-sectional view illustrating a fourth embodiment of an optical apparatus constructed in accordance with the invention.

Another presently preferred embodiment of the invention which is similar in some respects to apparatus 300 is shown in FIG. 8 and indicated therein generally at 400. Apparatus 400 includes a stator 402 rotatably supporting a first stage 404 through a rotatable auxiliary stage 406. A second stage 408 is rotatably supported by first stage 404 as shown.

First stage 404 includes a pair of mirrors, respectively indicated at 410 and 412. Second stage 408, on the other hand, maintains a single mirror 414. Second stage 408 further includes a transparent pane 416 through which LOS 24 may pass.

Components of apparatus 400 are driven in this case by a motor 418 having mounted thereon a gear 420. Gear 420 engages an annular gear 422 defined about a lower portion of first stage 404. As shown, gear 420 also engages a circumferential gear 424 defined about an inner surface of auxiliary stage 406. Auxiliary stage 406 imparts rotational motion to second stage 408 by engagement of a circumferential bevel gear 426 with an annular bevel gear 428 defined on an outer surface of second stage 408.

Figure 9:
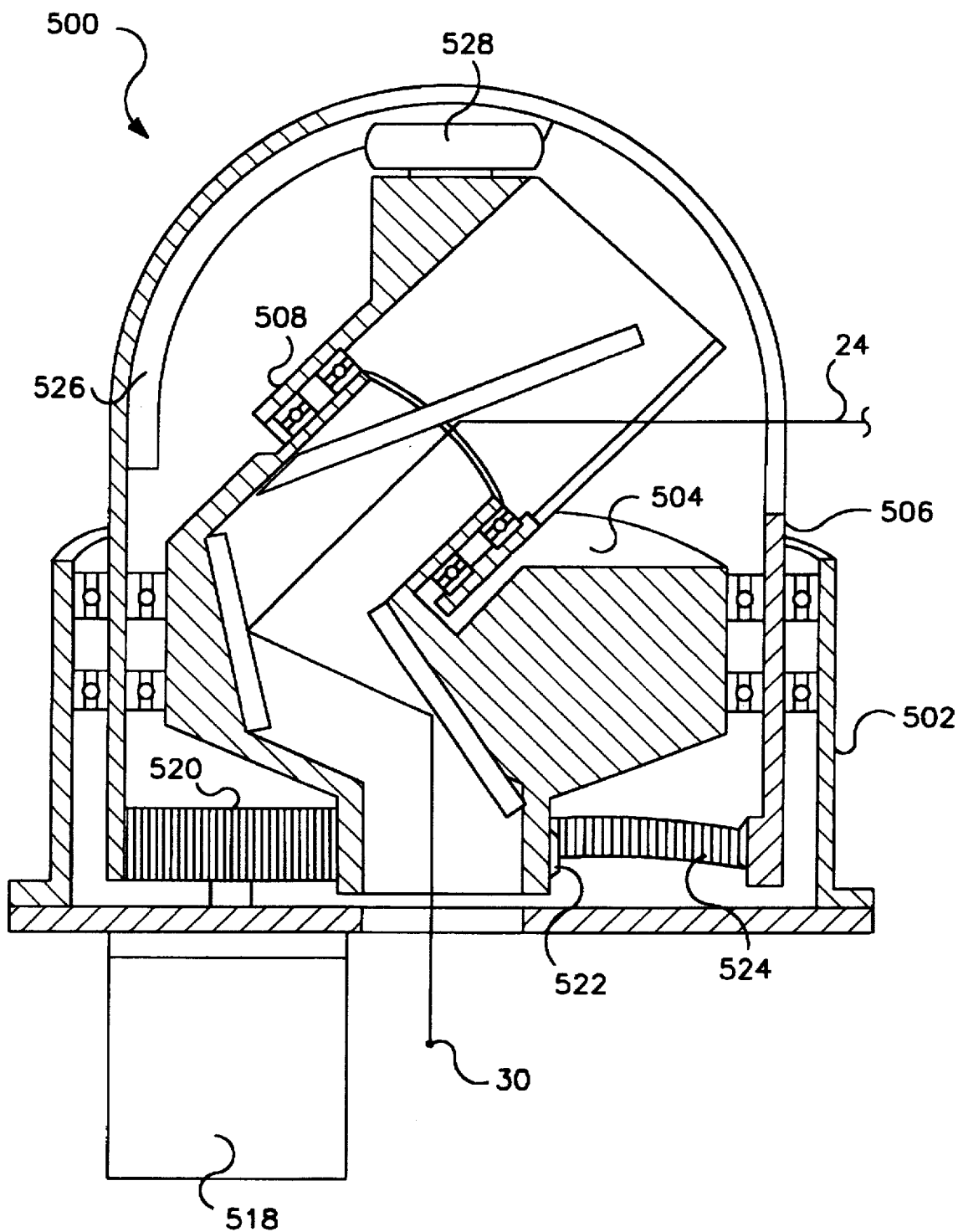
FIG. 9 is a partial cross-sectional view illustrating a fifth embodiment of an optical apparatus constructed in accordance with the invention.

Another presently preferred embodiment of an optical apparatus constructed in accordance with the present invention is shown in FIG. 9 and indicated therein generally at 500. Due to the many structural similarities between apparatus 500 and apparatus 400, similar elements will be indicated by a reference number augmented by addition of one hundred. For the sake of brevity, the operation of such similar elements will not be discussed in detail. In this case, however, auxiliary stage 506 defines a cam track 526 on an interior thereof. Second stage 508 is rotated by engagement of a suitable cam follower 528 with cam track 526 as shown.

Figure 10:
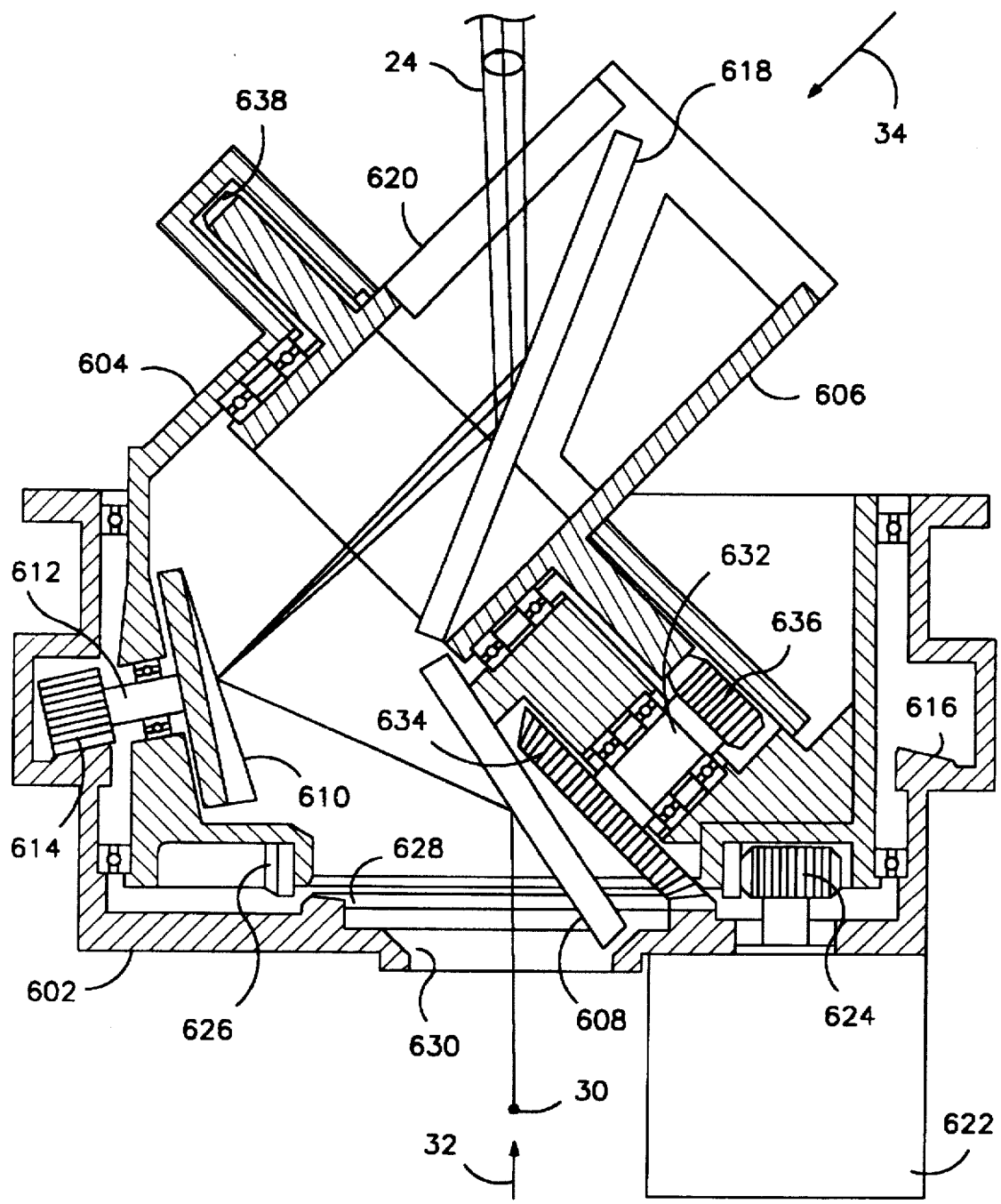
FIG. 10 is a partial cross-sectional view illustrating a sixth embodiment of an optical apparatus constructed in accordance with the invention.

FIG. 10 illustrates another presently preferred embodiment of an optical apparatus constructed in accordance with the invention. This optical apparatus, which is indicated generally at 600, includes a stator 602 rotatably supporting a first stage 604. A second stage 606 is rotatably supported by first stage 604, as shown.

First stage 604 includes two mirrors, respectively indicated at 608 and 610. As shown, mirror 610 is mounted on a shaft 612, which is rotatably supported within first stage 604. A gear 614 is mounted at the opposite end of shaft 612 for engagement with a circumferential gear 616 defined along the inside of stator 602. Third stage 606 includes a single mirror 618, to direct LOS 24 through transparent pane 620.

Components within apparatus 600 are operatively driven by a drive motor 622 having mounted thereon a drive gear 624. Gear 624 engages a circumferential gear 626 defined around a lower portion of first stage 604.

The drive train arrangement utilized to effect rotation of second stage 606 includes an annular bevel gear 628 defined on stator 602 about an aperture 630 through which LOS 24 passes. A shaft 632 captively mounted within first stage 604 includes a bevel gear portion 634 mounted at one end thereof for engagement with bevel gear 628. A second gear portion 636 mounted on the opposite end of shaft 632 engages a circumferential gear 638 defined about first stage 606. The bevel gear arrangement defined by the engagement of bevel gear 628 with bevel gear portion 634 is desirable in many applications because it allows considerable speed reduction between first stage 604 and second stage 606 without the use of gears having excessively large size ratios.

It can be seen that one full rotation of first stage 604 will cause mirror 610 to rotate several times. This causes the point of incidence of LOS 24 on mirror 618 to change slightly, which is then translated to the pattern "written" in field of regard 22. As a result, small loops are formed in the nominally spiralling pattern, as indicated at 640 in FIG. 1A. This feature may be desirable in certain applications to "fill in" some of the area between respective turns of the spiral. It should be understood, however, that many applications of the present invention are contemplated in which this feature may not be necessary or desirable.

Figure 11:
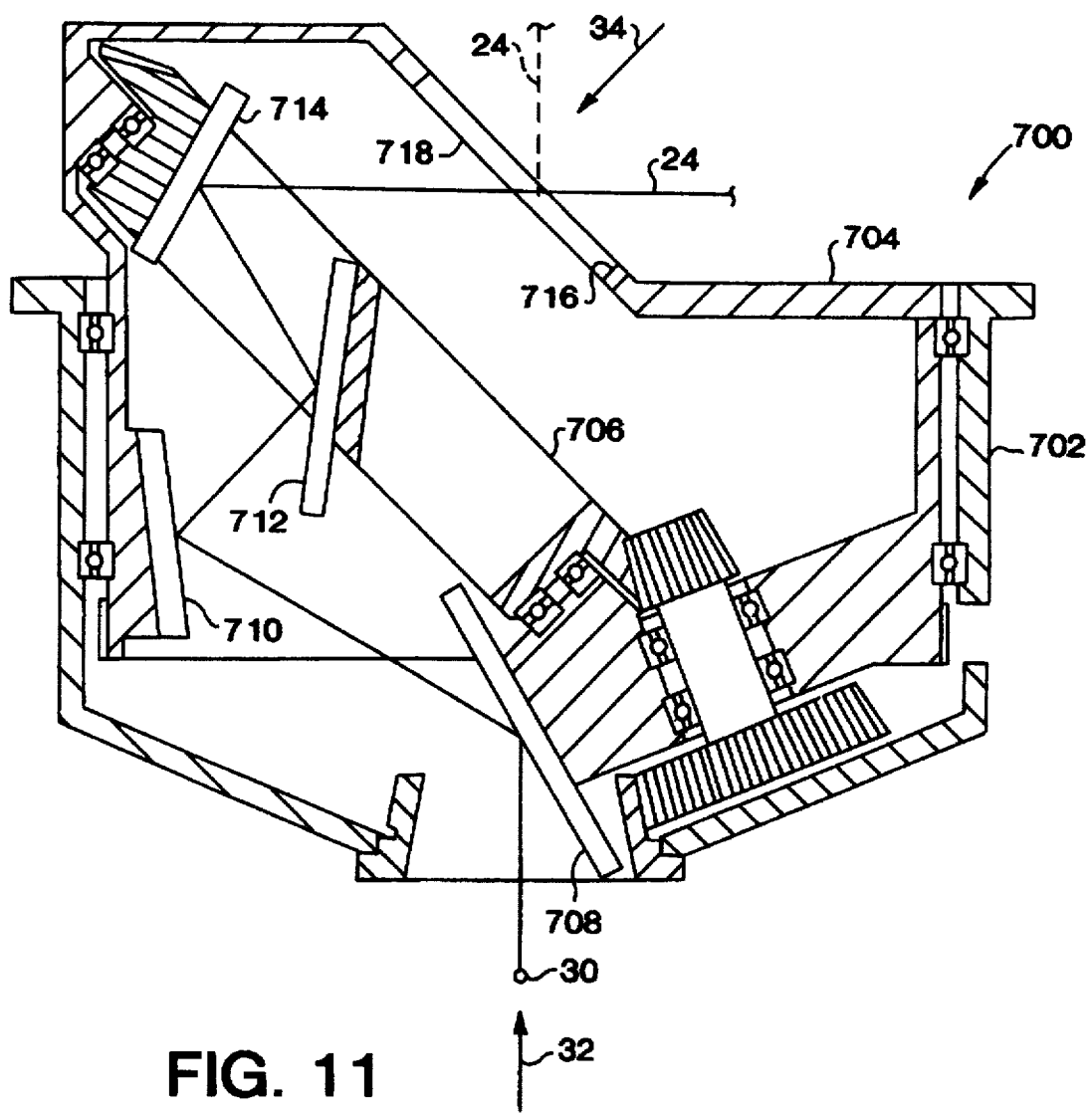
FIG. 11 is a partial cross-sectional view illustrating a seventh embodiment of an optical apparatus constructed an accordance with the invention.

Referring now to FIG. 11, another presently embodiment of an optical apparatus constructed in accordance with the present invention is indicated therein generally at 700. Apparatus 700 includes a stator 702 rotatably supporting a first stage 704. A second stage 706 is rotatably supported by first stage 704 as shown.

First stage 704 includes two mirrors 708 and 710 situated to direct LOS 24 between location 30 and along an axis substantially aligned with axis 34. In this case, second stage 706 also includes a pair of mirrors 712 and 714 which cooperate to direct LOS 24 through aperture 716 to the desired location within field of regard 22. Preferably, aperture 716 maintains therein a suitable transparent pane 718 as shown. It will be appreciated that an advantage of this four mirror configuration having nonorthogonal angles of incidence is that aperture 716 may be made relatively small.

Figure 12:
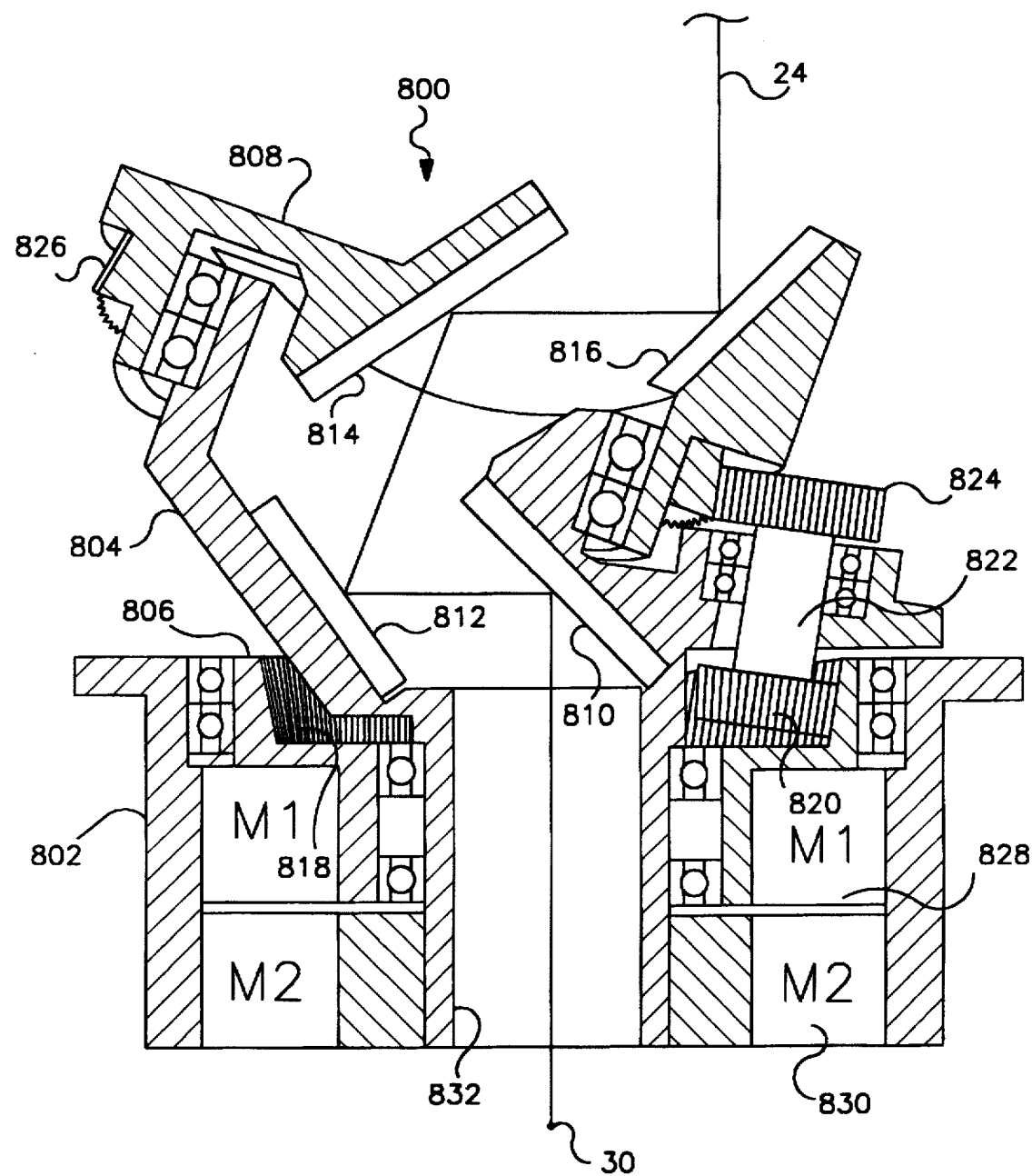
FIG. 12 is a partial cross-sectional view illustrating a ninth embodiment of an optical apparatus constructed an accordance with the invention.
Figure 13:
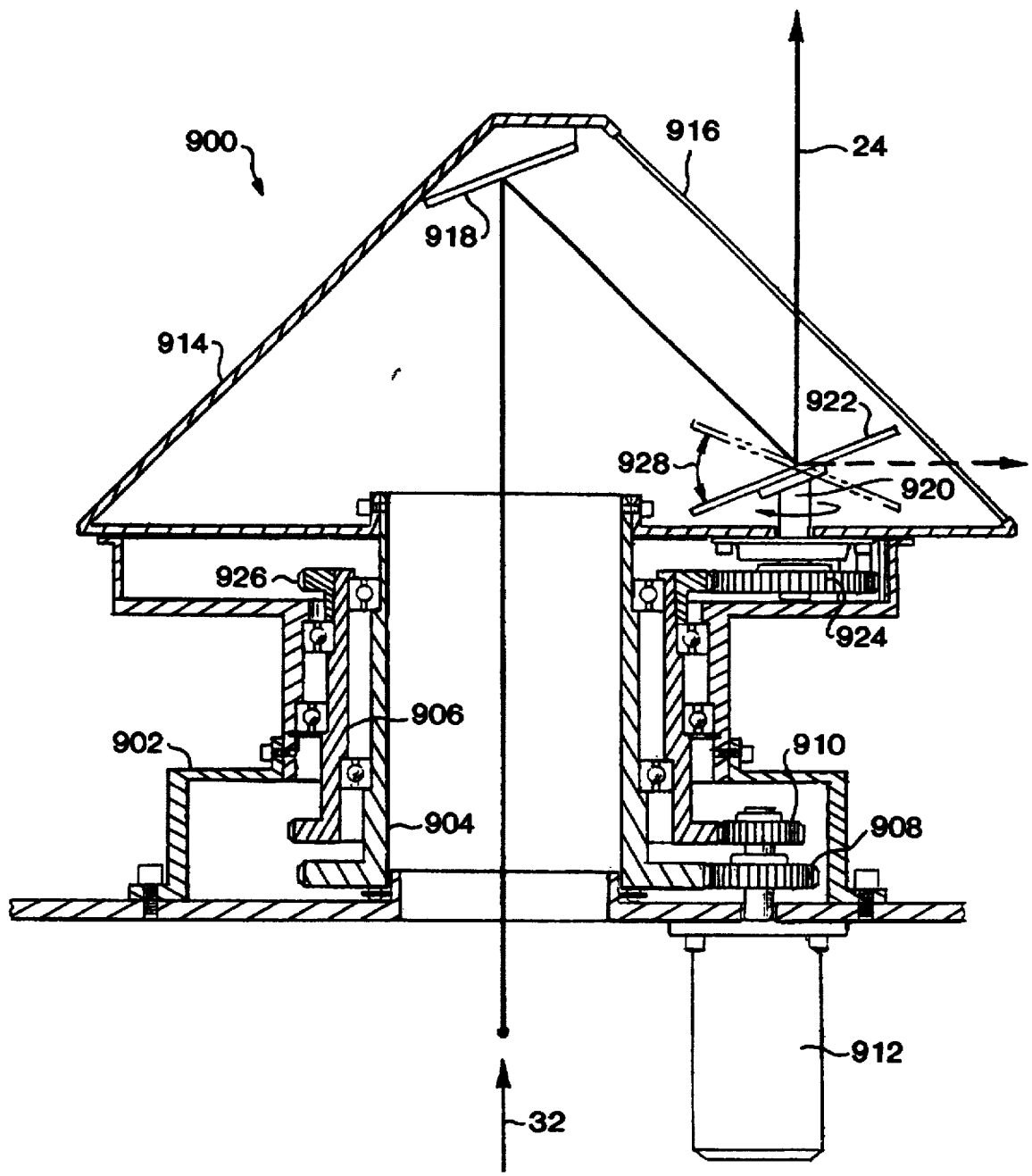
FIG. 13 is a partial cross-sectional view illustrating a tenth embodiment of an optical apparatus constructed in accordance with the invention.

A still further presently preferred embodiment of an optical apparatus constructed in accordance with the invention is shown in FIG. 12 and indicated therein generally at 800. Apparatus 800 includes a stator 802 rotatably supporting a first stage 804 through an auxiliary stage 806. A second stage 808 is rotatably supported by first stage 804 as shown. First stage 804 and second stage 808 each include a pair of mirrors, which are respectively indicated at even reference numbers 810 through 816.

The drive train arrangement utilized to rotate second stage 808 includes an inner circumferential gear 818 defined at an upper portion of auxiliary stage 806. Gear 818 engages a lower gear portion 820 mounted on a shaft 822, which is rotatably supported by first stage 804 as shown. A second gear portion 824 mounted to an opposite end of shaft 822 engages an outer circumferential gear 826 defined about second stage 808.

As will now be explained, first stage 804 and second stage 808 are individually driven to facilitate relatively precise positioning of LOS 24 to a specific location within field of regard 22 when desired. In this case, apparatus 800 employs a pair of annular torque motors diagrammatically illustrated at 828 and 830 (also referenced as "M1" and "M2"). It should be understood, however, that types of motors other than annular torque motors may also be utilized for this purpose.

As shown, motor 830 is mounted between stator 802 and a lower cylindrical portion 832 of first stage 804. As such, direct rotation of first stage 804 may be easily effected. Similarly, motor 828 is connected between stator 802 and auxiliary stage 806. Rotation of auxiliary stage 806 causes second stage 808 to rotate as desired through the interconnecting drive train arrangement.

FIGS. 13 through 16 illustrate various additional embodiments of the present invention which may have utility in particular applications. Thus, referring now to FIG. 13, an optical apparatus constructed in accordance with the present invention is indicated therein generally at 900. Apparatus 900 includes a stator 902 rotatably supporting a first stage 904 through an auxiliary stage 906. In this case, first stage 904 and auxiliary stage 906 are driven by respective drive gears 908, 910 of a foundation-based drive motor 912. First stage 904 includes an upper housing portion 914 defining therein a pane 916 to permit passage of light therethrough. As shown, the upper housing portion 914 maintains a first stage mirror 918.

The second stage of apparatus 900 is constructed as a shaft 920 rotatably supported by upper housing portion 914. A second stage mirror 922 is mounted as shown to an end of shaft 920 at an angle with respect to the perpendicular plane. Thus, as shaft 920 is operatively rotated, LOS 24 is directed between the first extreme and the second extreme position, as desired.

The drive train arrangement utilized to operatively rotate shaft 920 includes a gear 924 mounted at the end thereof opposite mirror 922. Gear 924 engages a circumferential gear 926 defined about an upper portion of auxiliary stage 906. Thus, rotation of first stage 904 causes gear 924 to revolve about gear 926 in a planet-sun relationship.

The drive train arrangement described for apparatus 900 is advantageous because the disposition of mirror 922 is varied utilizing a second stage which is fully rotational. It should be appreciated, however, that partial rotational motion may also be utilized to achieve this same purpose. For example, mirror 922 may be mounted on a support which extends perpendicular to the illustrated direction of shaft 920. Partial rotational motion of this support would cause mirror 922 to "waggle," as indicated by arrow 928. Such waggling may also achieve the desired variation of LOS 24 as first stage 904 is operatively rotated.

Figure 14:
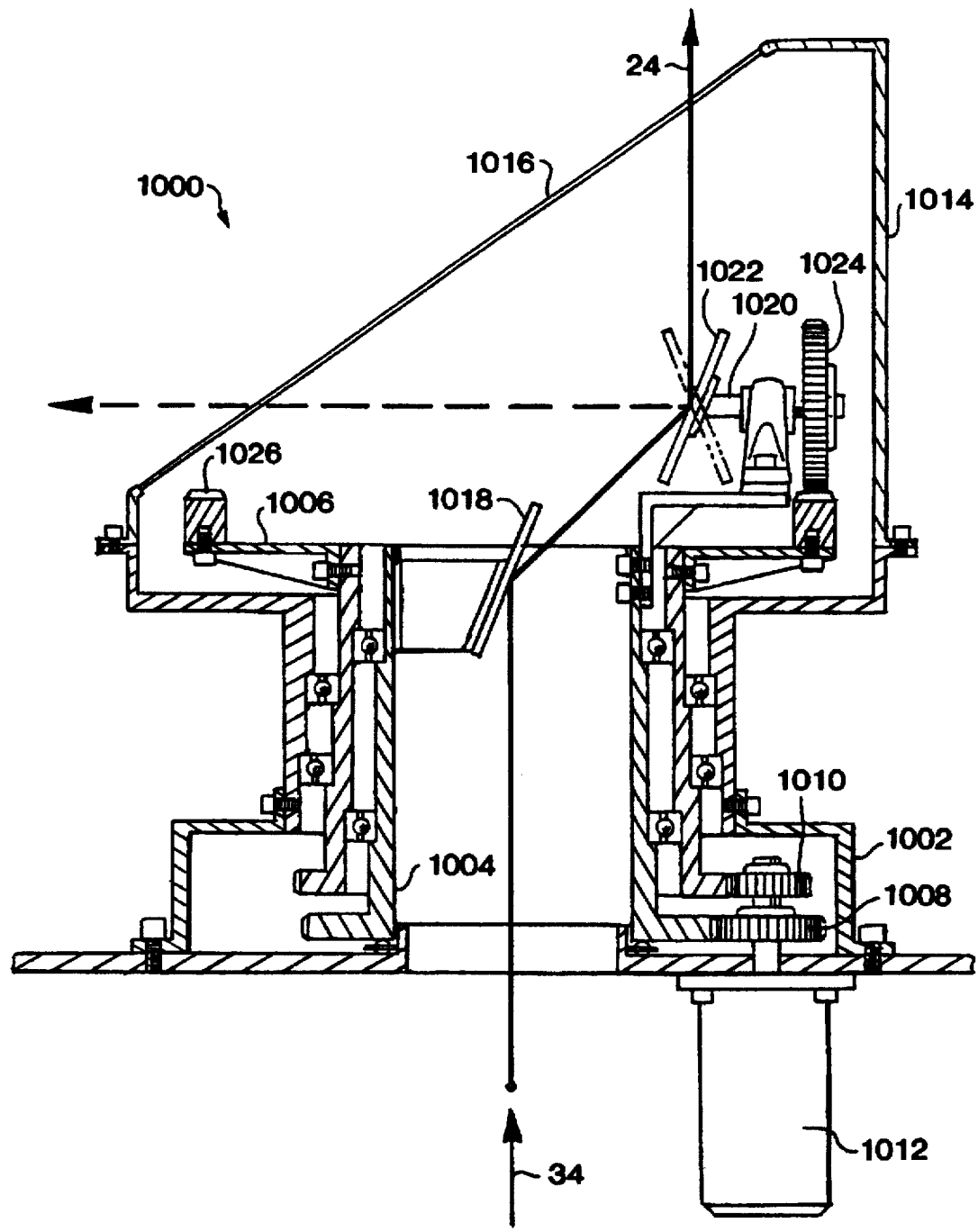
FIG. 14 is a partial cross-sectional view illustrating an eleventh embodiment of an optical apparatus constructed an accordance with the invention.

Referring not to FIG. 14, another presently preferred embodiment of an optical apparatus constructed in accordance with the present invention is indicated therein generally at 1000. Apparatus 1000 includes a stator 1002 rotatably supporting a first stage 1004 through an auxiliary stage 1006. In this case, first stage 1004 and auxiliary stage 1006 are driven by respective drive gears 1008, 1010 of a foundation-based drive motor 1012. First stage 1004 includes an upper housing portion 1014 defining therein a pane 1016 to permit passage of light therethrough. As shown, first stage 1004 maintains a single mirror 1018.

As with apparatus 900, the second stage of apparatus 1000 is constructed as a shaft 1020 rotatably supported by first stage 1004. A second stage mirror 1022 is mounted at an angle to an end of shaft 1020, as shown. Thus, as shaft 1020 is operatively rotated, LOS 24 is directed between the first extreme and the second extreme position, as desired.

The drive train arrangement utilized to operatively rotate shaft 1020 includes a gear 1024 mounted at the end thereof opposite mirror 1022. Gear 1024 engages a circumferential gear 1026 defined about an upper portion of auxiliary stage 1006. Thus, rotation of first stage 1004 causes gear 1024 to revolve about gear 1026 at a speed determined by the difference in rates of rotation between first stage 1004 and auxiliary stage 1006. As a result, gear 1024 is rotated.

Figure 15:
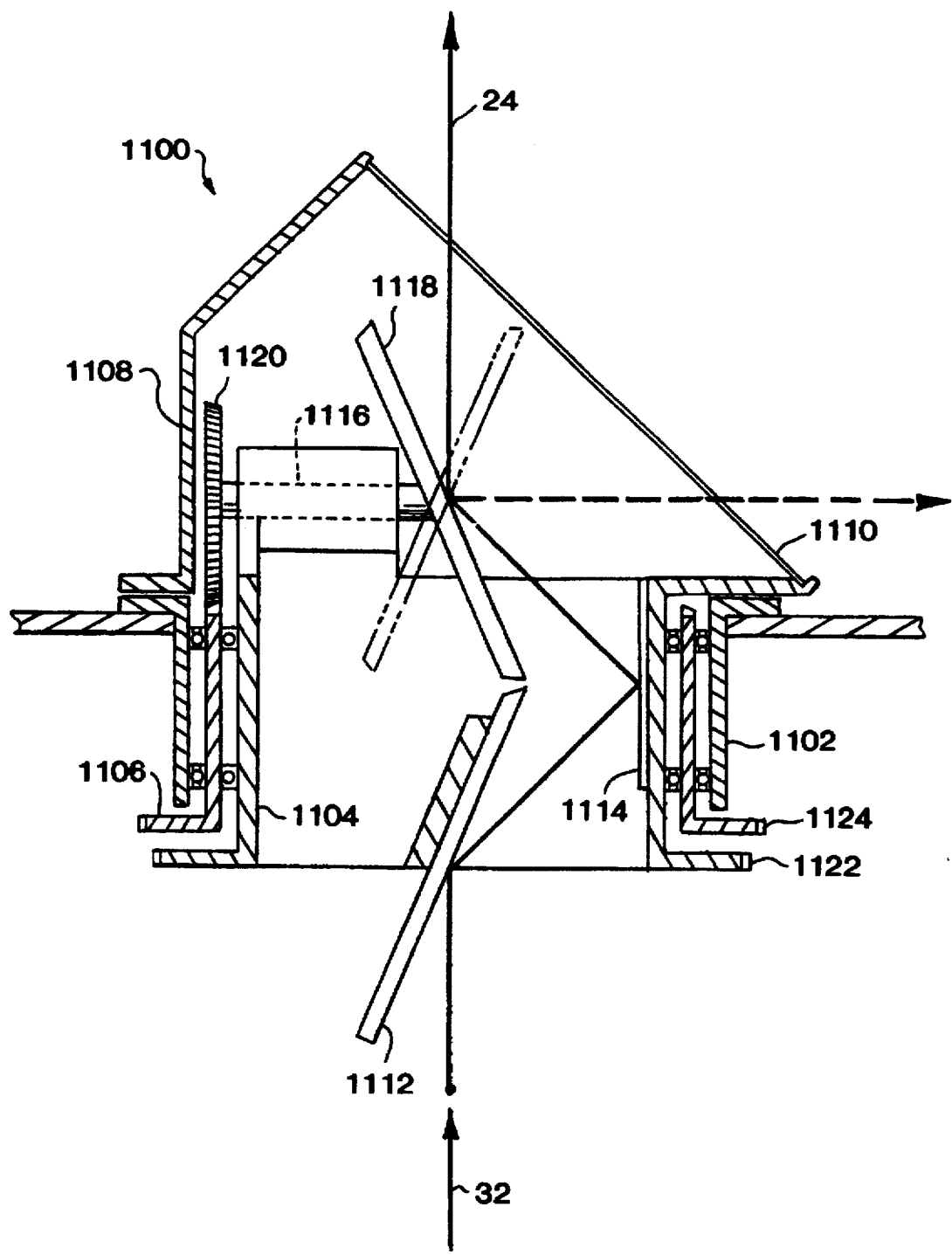
FIG. 15 is a partial cross-sectional view illustrating a twelfth embodiment of an optical apparatus constructed an accordance with the invention.

Referring to FIG. 15, another presently preferred embodiment of an optical apparatus constructed in accordance with the present invention is indicated therein generally at 1100. Apparatus 1100 includes a stator 1102 rotatably supporting a first stage 1104 through an auxiliary stage 1106. First stage 1104 includes an upper housing portion 1108 defining therein a pane 1110 to permit passage of light therethrough. As shown, first stage 1104 maintains a pair of first stage mirrors 1112, 1114.

The second stage of apparatus 1100 is constructed as a shaft 1116 rotatably supported by upper housing portion 1108. A second stage mirror 1118 is mounted at an angle to an end of shaft 1108, as shown. Thus, as shaft 1116 is operatively rotated, LOS 24 is directed between the first extreme position and the second extreme position.

The drive train arrangement utilized to operatively rotate shaft 1116 includes a gear 1120 mounted at the end thereof opposite mirror 1218. Gear 1120 engages a circumferential gear defined about an upper portion of auxiliary stage 1106. Thus, rotation of first stage 1104 causes gear 1120 to rotate. First stage 1104 and auxiliary stage 1106 are driven in this case by engagement of drive gears (not shown) with respective circumferential gears 1122, 1124.

Figure 16:
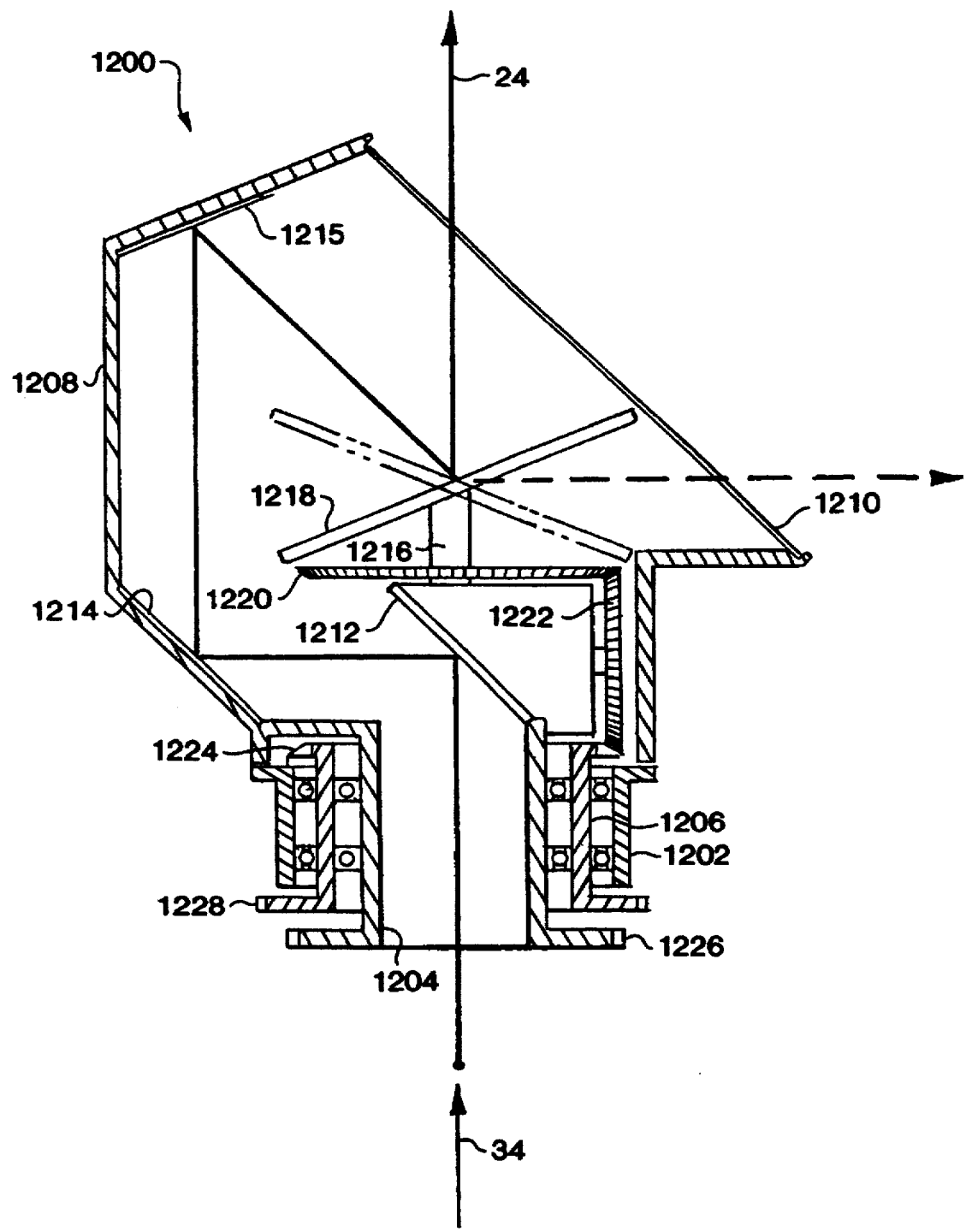
FIG. 16 is a partial cross-sectional view illustrating a thirteenth embodiment of an optical apparatus constructed in accordance with the invention.

Referring to FIG. 16, another presently preferred embodiment of an optical apparatus constructed in accordance with the present invention is indicated therein generally at 1200. Apparatus 1200 includes a stator 1202 rotatably supporting a first stage 1204 through an auxiliary stage 1206. First stage 1204 includes an upper housing portion 1208 defining therein a pane 1210 to permit passage of light therethrough. As shown, first stage 1204 maintains three first stage mirrors, respectively indicated at 1212, 1214 and 1215.

The second stage of apparatus 1200 is also constructed as a shaft 1216 rotatably supported by first stage 1204. A second stage mirror 1218 is mounted at an angle to an end of shaft 1208, as shown. Thus, as shaft 1216 is operatively rotated, LOS 24 is directed between the first extreme position and the second extreme position.

The drive train arrangement utilized to operatively rotate shaft 1216 includes a gear 1220 mounted at the end thereof opposite mirror 1118. Gear 1220 engages a gear 1222 rotatably supported by first stage 1204. Gear 1222, in turn, engages circumferential gear 1224 defined about an upper portion of auxiliary stage 1206. Thus, rotation of first stage 1204 causes gear 1220 to rotate. First stage 1204 and auxiliary stage 1206 are driven by engagement of drive gears (not shown) with respective circumferential gears 1226, 1228.

Figure 17:
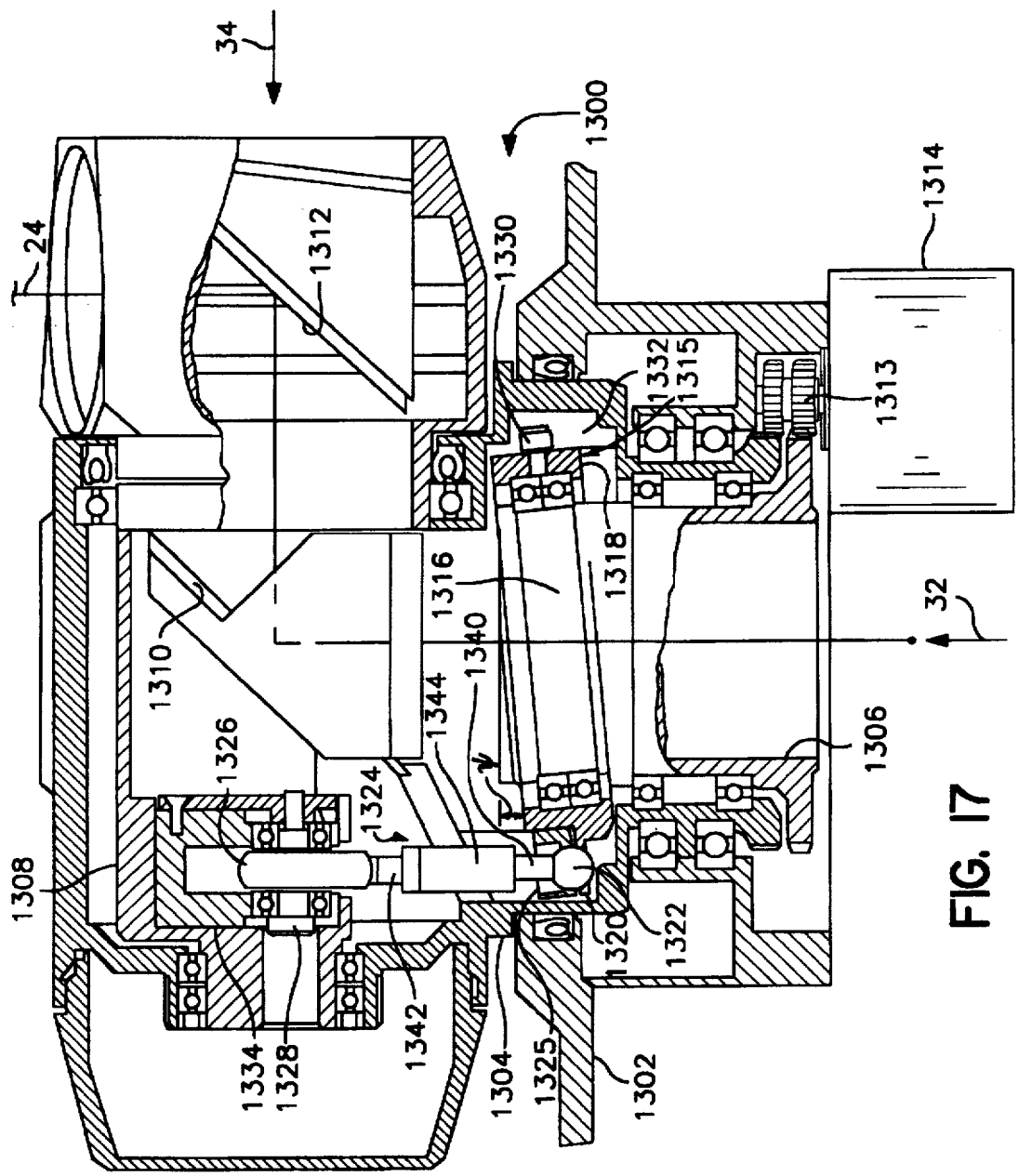
FIG. 17 is a partial cross-sectional view illustrating a fourteenth embodiment of an optical apparatus constructed an accordance with the invention.

FIG. 17 illustrates another presently preferred embodiment of an optical apparatus constructed in accordance with the present invention. This apparatus, which is indicated generally at 1300, includes a stator 1302 rotatably supporting a first stage 1304. An auxiliary stage 1306 is mounted coaxial with a portion of first stage 1304 and rotatably supported thereby. A second stage 1308 is rotatably supported by first stage 1304 as shown. In this case, first stage 1304 and second stage 1308 each maintain a single mirror, respectively indicated at 1310 and 1312.

It can be seen that apparatus 1300 is similar in many respects to apparatus 100 of FIGS. 2-4. Some important differences, however, reside in the configuration of the drive train arrangement utilized to transfer rotational motion provided by a driving element, such as output gear 1313 of drive motor 1314, to a partial rotational motion at second stage 1308. These differences will now be described.

The apparatus includes a suitable translation assembly 1315 operatively connected between auxiliary stage 1306 and a linkage (as will be described below) such that rotation of auxiliary stage 1306 causes the linkage to longitudinally reciprocate. In this case, auxiliary stage 1306 includes an upper circumferential portion 1316 situated at an acute angle with respect to an axis orthogonal to axis 32. Translation assembly 1315 thus includes a translation element, here in the form of an annular member 1318, rotatably supported by portion 1316 and mounted coaxial therewith. Annular member 1318 includes a ledge portion 1320 defining therein a socket for receiving the spherical end portion 1322 of an elongated linkage indicated generally at 1324. A retaining piece 1325 may be provided to captively maintain end portion 1322 in the socket.

The end of linkage 1324 opposite end portion 1322 is configured as an eyelet 1326. As shown, a rod 1328, which is rotatably supported by second stage 1308, extends through the bore defined by eyelet 1326. As a result, linkage 1324 will be pivotally connected to second stage 1308.

Annular member 1318 further carries a radial pin 1330 received in an axial slot 1332 defined in first stage 1304. This arrangement prevents relative rotation between annular member 1318 and first stage 1304. Instead, the disparate rates of rotation between first stage 1304 and auxiliary stage 1306 will cause pin 1330 to move up and down in slot 1332. Similarly, linkage 1324 is caused to reciprocate longitudinally.

It should be noted that the pivotal connection of linkage 1324 to second stage 1308 is axially parallel to second axis of rotation 34, but displaced therefrom by a predetermined distance. As a result, longitudinal reciprocation of linkage 1324 will cause second stage 1308 to be partially rotated through a range preferably not exceeding 180°. In presently preferred embodiments, second stage 1308 will be rotated through a range of approximately 90° in this manner. Thus, the drive train arrangement, including auxiliary stage 1306, translation assembly 1315 and linkage 1324, functions to translate the fully rotational motion provided by output gear 1313 to a reciprocative partial rotational motion, as desired.

Figure 18A:
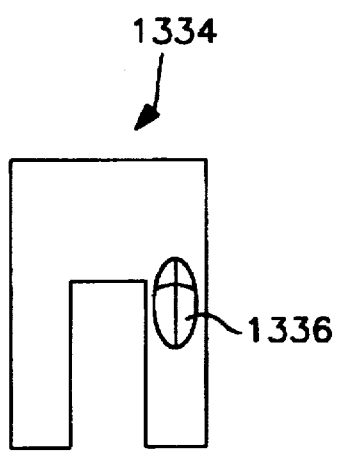
FIG. 18A is a side elevation of an adjustment member utilized in the embodiment of FIG. 17.
Figure 18B:
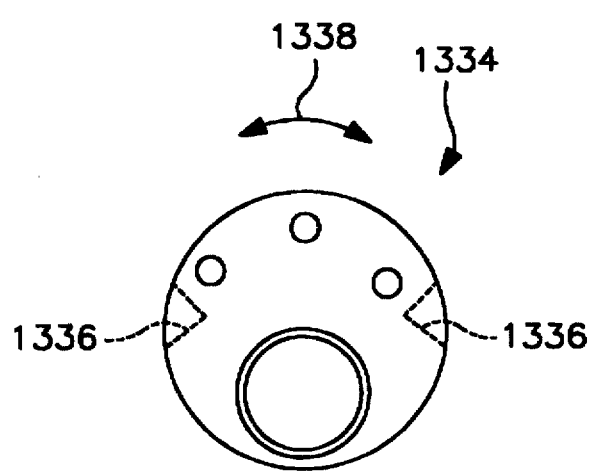
FIG. 18B is a front elevation of the adjustment member of FIG. 18A.

In the illustrated embodiment, the translation assembly is configured so that the throw of linkage member 1324 may be varied between different extremes. Toward this end, shaft 1328 may be rotatably supported by an adjustment member 1334 captively maintained within a receiving socket defined in second stage 1308. Member 1334 is fixed in position by set screws extending through second stage 1308. These set screws are received in notches 1336 defined in the outer circumferential surface of member 1334 which can be seen most clearly in FIGS. 18A and 18B. If the set screws are loosened, member 1334 may be rotated within a predetermined range, as indicated by the arrow 1338. After such rotation, the set screws may again be tightened to screw member 1334 in position. In this manner, the throw of second stage 1308 may be adjusted.

As a further feature, linkage 1324 may be constructed of a number of interconnected pieces. Specifically, a first piece 1340 and a second piece 1342 may be interconnected by an elongated nut 1344 as shown. Rotation of nut 1344 in one direction will cause elongation of linkage 1324. Conversely, rotation of nut 1344 in the opposite direction will cause the length of linkage 1324 to shorten.

While the term "gear" is used in many places in the present specification and claims, one of ordinary skill in the art will appreciate that the same function may often be performed, for example, by frictional engagement of wheels or running surfaces such as those of apparatus 100. Thus, it will often be appropriate to construe the term "gear" broadly to include such arrangements. Additionally, it has been demonstrated that the function of the disclosed "mirrors" may often also often be performed by a prism or the like. Thus, the term "mirror" should also be construed broadly to include, where appropriate, any reflective interface.

These and other modifications and variations of the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, of ordinary skill in the art will appreciate the foregoing description is by way of example only, and is not intended to be limitative of the invention so further described in such appended claims.

What is claimed is:

1. An optical apparatus for selectively directing a line of sight between a residence location and locations within a field of regard, said optical apparatus comprising:

a stator;

a first stage supported by said stator, said first stage being rotatable about a first axis of rotation;

a second stage supported by said first stage, said second stage being at least partially rotatable about a second axis of rotation;

at least one second stage mirror maintained by said second stage and situated to direct the line of sight as said second stage is operatively rotated between a first extreme position and a second extreme position;

at least one first stage mirror maintained by said first stage and situated to direct the line of sight from the residence location to said at least one second stage mirror; and a drive train arrangement coupled to said second stage and operative to translate full rotational motion of a driving element to a reciprocative partial rotational motion, said drive train arrangement including:

(a) an auxiliary stage situated coaxial with said first stage and supported for relative rotation therewith, said auxiliary stage being rotationally driven by said driving element;

(b) a linkage having a first end and a second end, said first end pivotally connected to said second stage such that a longitudinal reciprocation of said linkage will effect a reciprocative partial rotational motion in said second stage; and (c) a translation assembly operatively connected between said auxiliary stage and said second end of said linkage such that rotation of said auxiliary stage causes said linkage to longitudinally reciprocate.

2. An optical apparatus as set forth in claim 1, wherein said first end of said linkage is pivotally connected to said second stage at a pivot location substantially parallel to said second axis of rotation and displaced therefrom by a predetermined distance.

3. An optical apparatus as set forth in claim 1, wherein said auxiliary stage includes a circumferential portion oriented at an acute angle with respect to an angle orthogonal to said first axis of rotation, said translation assembly including a translation element operatively connected to said circumferential portion.

4. An optical apparatus as set forth in claim 3, wherein said translation element is further operatively connected to said first stage such that substantially no relative angular movement occurs therebetween.

5. An optical apparatus as set forth in claim 3, wherein said translation element comprises an annular member rotatably supported by said circumferential portion of said auxiliary stage, said second end of said linkage pivotally connected to a circumferential location on said annular member.

6. An optical apparatus as set forth in claim 5, wherein said annular member includes a ledge portion to which said second end of said linkage member is pivotally connected.

7. An optical apparatus as set forth in claim 6, wherein said second end of said linkage member includes a spherical portion, said spherical portion received in a socket defined in said ledge portion.

8. An optical apparatus as set forth in claim 7, further comprising a retaining piece attached to said ledge portion for maintaining said spherical portion in said socket.

9. An optical apparatus as set forth in claim 5, wherein said translational element is operatively connected to said first stage such that substantially no relative angular movement occurs therebetween.

10. An optical apparatus as set forth in claim 9, wherein said first stage defines therein an axial slot and further wherein said translation element includes a radial pin received in said axial slot, said translation element being thereby connected to said first stage so that substantially no relative angular movement occurs therebetween.

11. An optical apparatus constructed in accordance with claim 1, further comprising first and second drive means respectively engaging said first stage and said auxiliary stage for causing rotation thereof.

12. An optical apparatus constructed in accordance with claim 11, wherein said first drive means and said second drive means collectively comprises a single drive motor having an output shaft, said output shaft having a first drive gear and a second drive gear axially mounted thereon, said first drive gear engaging said first stage and said second drive gear engaging said auxiliary stage.

13. An optical apparatus constructed in accordance with claim 1, wherein said at least one second stage mirror includes a single mirror.

14. An optical apparatus constructed in accordance with claim 1, wherein said at least one first stage mirror includes a single mirror situated to direct the line of sight between the residence location and substantially along said second axis of rotation, said second axis of rotation being substantially orthogonal to the first axis of rotation.

15. An optical apparatus constructed in accordance with claim 14, wherein said at least one second stage mirror includes a single mirror.

* * * * *